(12) United States Patent
Kim et al.

(10) Patent No.: US 7,376,997 B2
(45) Date of Patent: May 27, 2008

(54) RINSE CONTROL METHOD FOR WASHING MACHINE

(75) Inventors: Jong-Ho Kim, Gyeongsangnam-Do (KR); Chang-Won Ryu, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 589 days.

(21) Appl. No.: 10/466,275

(22) PCT Filed: Jan. 16, 2002

(86) PCT No.: PCT/KR02/00068

§ 371 (c)(1),
(2), (4) Date: Jul. 15, 2003

(87) PCT Pub. No.: WO02/057530

PCT Pub. Date: Jul. 25, 2002

(65) Prior Publication Data

US 2004/0045097 A1 Mar. 11, 2004

(30) Foreign Application Priority Data

Jan. 16, 2001 (KR) .................................. 2001-2403

(51) Int. Cl.
*D06F 33/02* (2006.01)
(52) U.S. Cl. ........................... 8/159; 68/181 R; 68/207
(58) Field of Classification Search .............. 68/181 R, 68/182, 207
See application file for complete search history.

(56) References Cited

U.S. PATENT DOCUMENTS

| | | | | |
|---|---|---|---|---|
| 1,496,644 A | * | 6/1924 | Karasinski | .................... 68/148 |
| 1,682,473 A | * | 8/1928 | Bercaw | ........................ 68/148 |
| 1,861,244 A | * | 5/1932 | Schwieterman | ................. 8/159 |
| 2,313,928 A | * | 3/1943 | Dyer | ............................ 68/23.3 |
| 2,383,783 A | * | 8/1945 | Dunham | ......................... 8/159 |
| 2,700,473 A | * | 1/1955 | Emmert et al. | ................ 34/319 |
| 2,959,043 A | * | 11/1960 | Johnson | ..................... 68/12.23 |
| 2,986,916 A | * | 6/1961 | Bochan | ......................... 68/19.2 |
| 3,576,041 A | * | 4/1971 | Marshall | ......................... 8/158 |
| 3,648,487 A | * | 3/1972 | Hoffman | .................... 68/12.19 |
| 3,740,975 A | * | 6/1973 | Cornelius | .................... 68/18 F |
| 3,744,325 A | * | 7/1973 | Brucken | ......................... 74/82 |
| 3,772,902 A | * | 11/1973 | Noguchi | ...................... 68/18 F |
| 3,811,300 A | * | 5/1974 | Barton et al. | .............. 68/12.19 |
| 3,927,541 A | * | 12/1975 | Thibaut | ...................... 68/12.05 |
| 4,784,666 A | * | 11/1988 | Brenner et al. | ................. 8/137 |
| 4,986,093 A | * | 1/1991 | Pastryk et al. | .............. 68/13 R |

(Continued)

FOREIGN PATENT DOCUMENTS

CN    1109120    9/1995

(Continued)

*Primary Examiner*—Frankie L. Stinson
(74) *Attorney, Agent, or Firm*—McKenna Long & Aldridge LLP

(57) ABSTRACT

A rinse control method for a washing machine including the steps of rinsing water supplying and infiltrating for supplying rinsing water rotating an inner tub at relatively low speed so that the rinsing water can be infiltrated into washing materials and rinsing water permeating and exhausting for draining the rinsing water rotating the inner tub at relatively high speed so that the rinsing water can be exhausted to the outside passing through the washing materials enable a swift rinsing operation with a smaller amount of rinsing water.

20 Claims, 24 Drawing Sheets

U.S. PATENT DOCUMENTS

| | | | | |
|---|---|---|---|---|
| 5,150,588 | A | * 9/1992 | Singh et al. | 68/23.5 |
| 5,167,722 | A | 12/1992 | Pastryk et al. | |
| 5,271,251 | A | * 12/1993 | Kovich et al. | 68/171 |
| 5,469,719 | A | * 11/1995 | Imai et al. | 68/12.04 |
| 5,504,955 | A | * 4/1996 | Mueller et al. | 8/158 |
| 5,537,761 | A | * 7/1996 | Oh | 34/499 |
| 5,606,877 | A | 3/1997 | Hashimoto | |
| 5,737,790 | A | * 4/1998 | Badger et al. | 8/158 |
| 5,743,115 | A | 4/1998 | Hashimoto | |
| 6,134,925 | A | * 10/2000 | Fujii et al. | 68/12.04 |
| 6,247,339 | B1 | * 6/2001 | Kenjo et al. | 68/12.04 |
| 6,351,974 | B1 | * 3/2002 | Lyu et al. | 68/148 |

FOREIGN PATENT DOCUMENTS

| | | | |
|---|---|---|---|
| CN | 1138117 | | 12/1996 |
| CN | 1246552 | | 3/2000 |
| EP | 0373063 A1 | | 6/1990 |
| EP | 0551007 A1 | | 7/1993 |
| JP | 59-171582 | * | 9/1984 |
| JP | 59-203593 | * | 11/1984 |
| JP | 4-266798 | * | 9/1992 |
| JP | 06-262391 | | 9/1994 |
| JP | 08-066592 | | 3/1996 |
| JP | 10-033892 | | 2/1998 |
| JP | 10-179973 | | 7/1998 |
| JP | 11-047490 | | 2/1999 |
| JP | 11-290584 | * | 10/1999 |
| JP | 11-319363 | * | 11/1999 |
| JP | 2000-14959 | * | 1/2000 |
| JP | 2000-325690 | | 11/2000 |
| KR | 09-262391 | | 10/1997 |
| KR | 10-0175851 | | 11/1998 |
| WO | WO-01/59196 A1 | | 8/2001 |

* cited by examiner

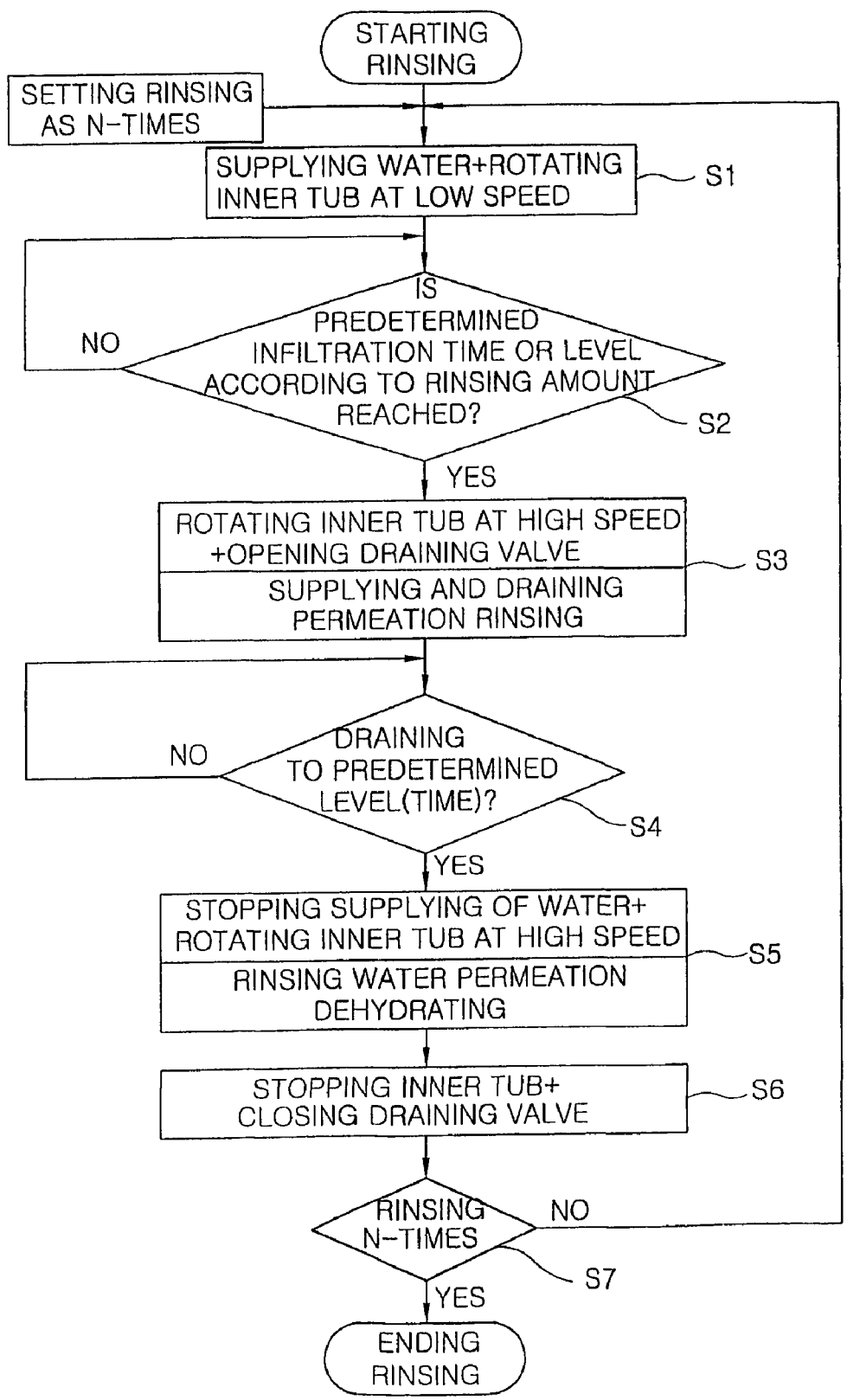

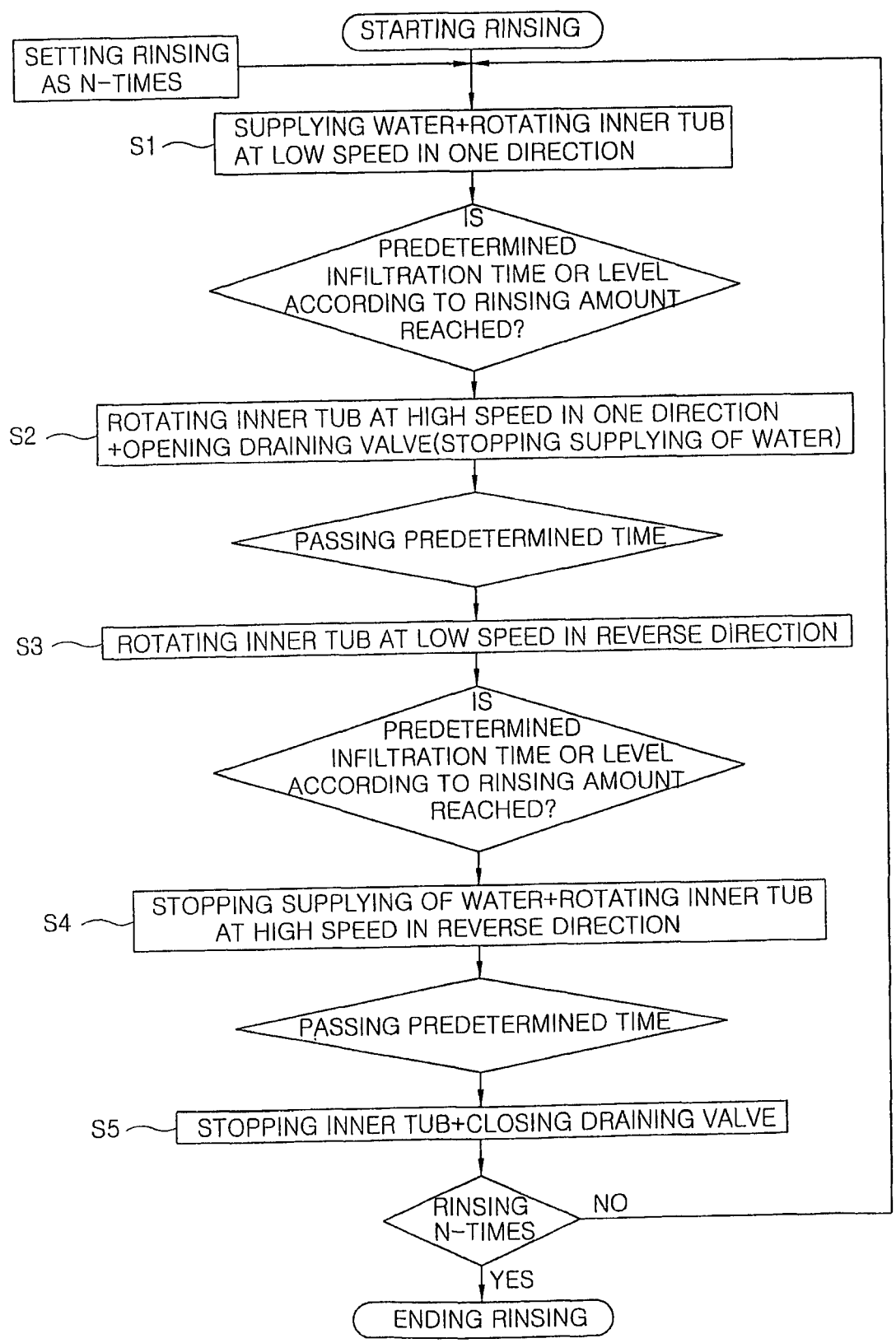

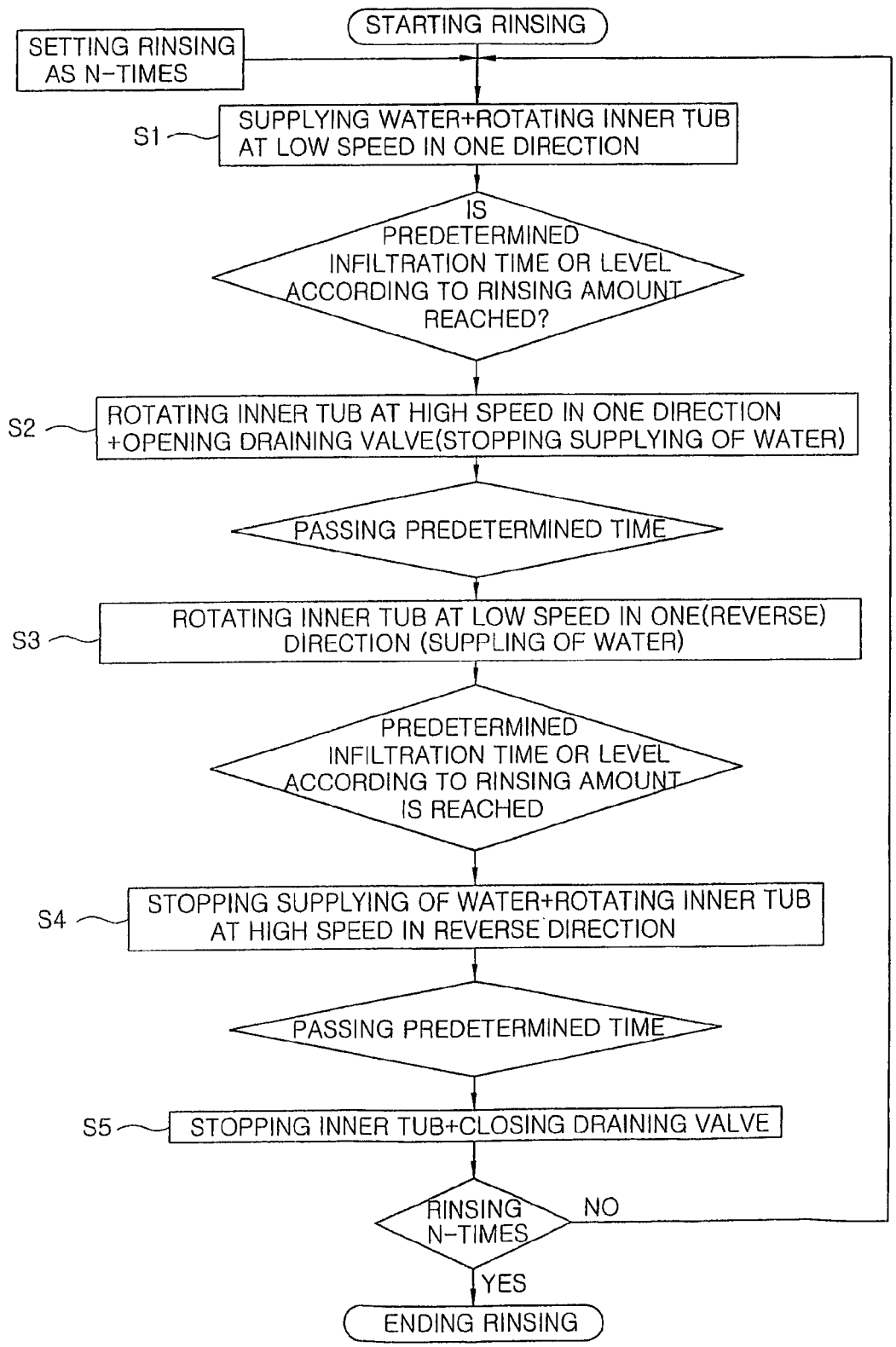

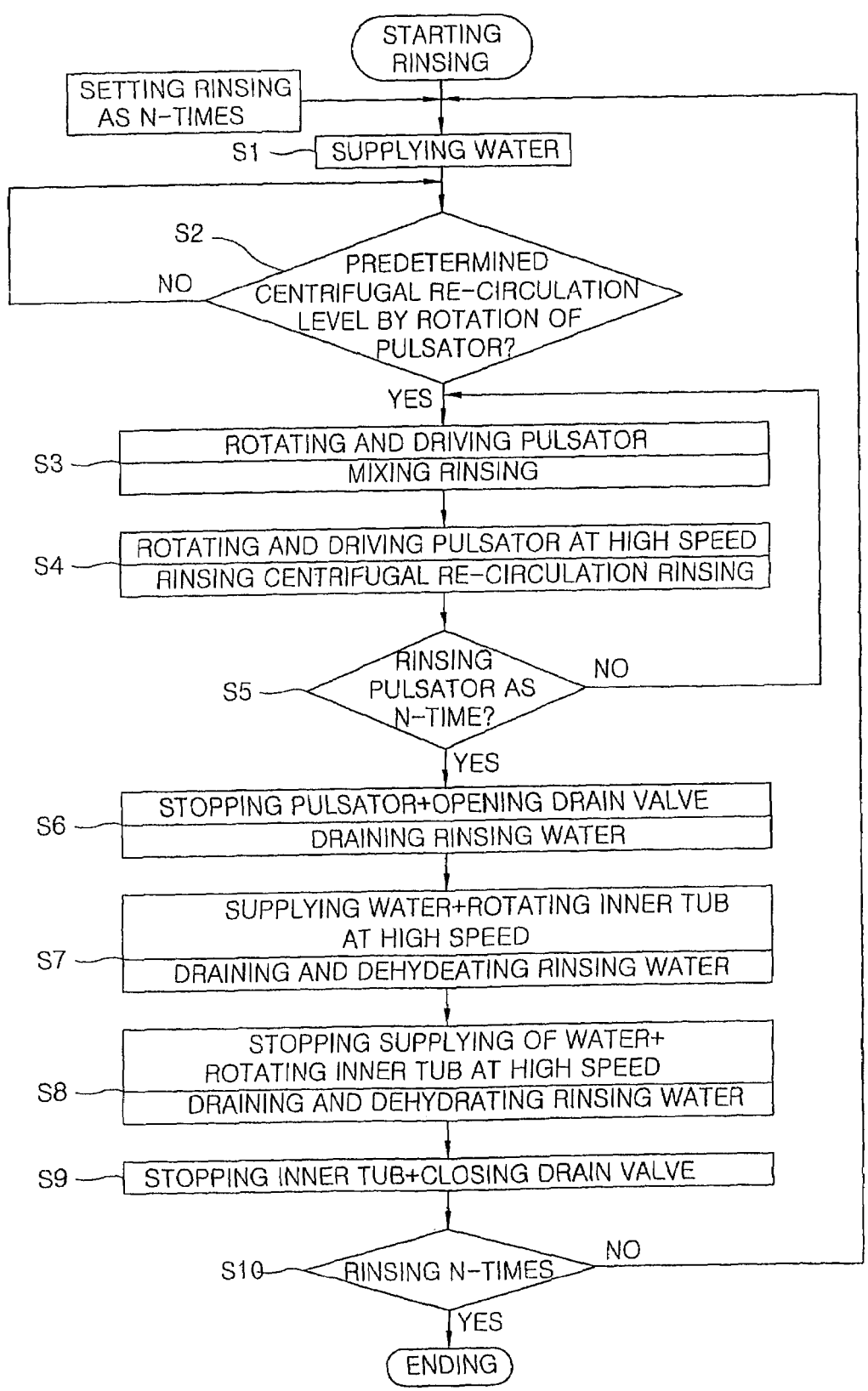

RINSE CONTROL METHOD FOR WASHING MACHINE

TECHNICAL FIELD

The present invention relates to a rinse control method for a washing machine, and particularly to a rinse control method for a washing machine, capable of performing a rapid rinsing operation of washing materials with smaller amount of rinsing water.

BACKGROUND ART

FIG. 1 is a cross-sectional view showing a motor direct drive washing machine.

Generally, a motor direct drive washing machine has an outer tub supported by four dampers 30 in the case 10 of the washing machine, for storing wash water or rinsing water and an inner tub 23 in the outer tub 21, in which washing materials are inserted and washed.

A driving motor 40 for rotating and driving the inner tub 23 is installed at the lower portion of the outer tub 21, and draining hose 26, and draining valve 27 for discharging wash water is connected at the lower portion of the outer tub 21.

A pulsator 25 for improving washing efficiency is positioned on the bottom surface of the inner tub 23.

Such motor direct driving washing machine performs washing and rinsing operation, being rotated and driven according to the operation of the driving motor 40, under the condition that the outer tub 21 is hung by a damper 30 inside the case 10 of the washing machine.

FIG. 2 is a cross-sectional view showing a washing machine in which a pump circulation apparatus is installed in the motor direct driving washing machine.

Namely, the pump circulation apparatus is connected with a circulation hose 50 from the draining hose 26' to the upper side of the inner tub 23', a circulation pump 55 for compulsorily circulating wash water is positioned at the divergence point of the circulation hose 50, and an injection orifice 60' is positioned at an end of the circulation hose 50 positioned at the upper side of the outer tub 21'.

In the washing machine with such pump circulation apparatus, the washing and rinsing operations are performed by performing mixing operation, rotating the inner tub 23' to the right and left directions in the washing or rinsing journeys, and compulsorily circulating wash water through the circulation pump 55.

FIG. 3 is a flow chart illustrating the rinsing method in accordance with the conventional art achieved in the above motor direct washing machine.

In the conventional washing machine, washing operation of the washing materials is performed continuing washing, rinsing and dehydrating journeys.

With reference to FIGS. 1 and 3, rinsing operation is performed by stopping supplying of water when the water reaches to a predetermined level as water is supplied to the outer tub 21 after the washing stroke is completed, then the driving motor 40 is operated and the inner tub 23 is rotated and driven to the left and right directions.

Here, the rinsing operation is processed, including the step of injecting the rinsing water by circulating to the upper portion, by operating the circulation pump 55, in case a pump circulation apparatus is installed as in FIG. 2.

After performing the rinsing operation, the driving motor 40 is stopped and the rinsing water inside the outer tub 21 is drained to the outside through the draining hose 26 as the draining value 27 installed at the lower portion of the outer tub 21 is opened.

Then, the dehydrating stroke for removing remaining rinsing water is performed by rotating the inner tub 23 at high speed as the driving motor 40 is operated.

The rinsing stroke operated as above is performed 2 to 3 times and when the rinsing stroke is completed, the inner tub 23 is rotated at high speed and the dehydrating stroke for removing moisture contained in the washing materials is processed.

However, with the conventional rinse control method for the washing machine, much amount of rinsing water is used, the water supplying and draining time is increased and rinsing performance is decreased, since mixing rinsing can be done by filling rinsing water to a predetermined level of the outer tub 23 so that the washing materials are sufficiently soaked in the rinsing water.

TECHNICAL GIST OF THE PRESENT INVENTION

Therefore, a main object of the present invention is to provide a rinse control method for a washing machine, capable of reduce rinsing water and operating without additional water supplying time, draining time, dehydrating time and the like, thus to considerably reduce rinsing time.

Also, another object of the present invention is to provide a rinse control method for a washing machine, capable of improving rinsing performance by having the rinsing water be infiltrated and permeated evenly into the washing materials by setting rotation direction different according to respective steps.

Also, still another object of the present invention is to provide a rinse control method for a washing machine, capable of improving rinsing performance as the rinsing water is infiltrated into the washing materials by repeating rotating a pulsator or rotating the inner tub or breaking so that washing materials stuck on the inner wall of the inner tub.

Also, still another object of the present invention is to provide a rinse control method for a washing machine, capable of improving rinsing performance using small amount of rinsing water by performing centrifugal permeation rinsing operated by circulating the rinsing water by rotating the inner tub at high speed and infiltration permeation rinsing operated by draining and dehydrating infiltrating the rinsing water into the washing materials in turn.

Also, still another object of the present invention is to provide a rinse control method for a washing machine, capable of improving rinsing performance using small amount of water by simultaneously draining and performing infiltrating rinsing rotating the inner tub after performing re-circulation rinsing through the passage formed on the inner wall of the inner tub by rotating the pulsator.

DETAILED DESCRIPTION OF THE INVENTION

In order to achieve the above objects, there is provided a rinse control method for a washing machine, including the steps of: rinsing water supplying and infiltrating for supplying rinsing water rotating an inner tub at relatively low speed so that the rinsing water can be infiltrated into washing materials and rinsing water permeating and exhausting for draining the rinsing water, rotating the inner tub at relatively high speed so that the rinsing water can be exhausted to the outside passing through the washing material.

In accordance with an embodiment of the present invention, rotation speed in the step of rinsing water supplying and infiltrating is lower than 300 rpm and the rotation speed in the step of rinsing water permeating and exhausting is higher than 200 rpm.

In accordance with the embodiment of the present invention, the rinsing water is supplied gradually increasing the rotation speed of an inner tub in the step of rinsing water supplying and infiltrating.

In accordance with the embodiment of the present invention, further includes a step of circulation rinsing for rinsing washing materials for rinsing washing materials as the rinsing water is spouted from the upper portion of the inner tub under the condition that the supply of water is stopped when the storage amount of rinsing water reaches a predetermined level, between the steps of rinsing water supplying and infiltrating and rinsing water permeating and exhausting.

In accordance with the embodiment of the present invention, further includes a step of water supplying and draining and permeation rinsing for draining the rinsing water stored in the outer tub and at the same time, continuously supplying the rinsing water until a predetermined time is passed from the point of time of starting draining or the water level is lower than a predetermined level so that the washing materials are rinsed, between the steps of rinsing water supplying and infiltrating and rinsing water permeating and exhausting.

In accordance with the embodiment of the present invention, the steps of rinsing water supplying and infiltrating and rinsing water permeating and exhausting are repeatedly performed as a predetermined time and rotation direction of the inner tub at least at a step of the respective setting steps is opposite to the rotation direction the other steps.

Here, the rotation directions of the inner tub in the steps of rinsing water supplying and infiltrating and rinsing water permeating and exhausting can be opposite to the rotation direction of the former step.

Also, the rotation speed of the inner tub in the step of rinsing water supplying and infiltrating can be set higher than the rotation speed at the former step of rinsing water permeating and exhausting.

Also, the rotation direction of the inner tub in the step of rinsing water supplying and infiltrating and the rotation direction of the inner tub in the step of rinsing water permeating and exhausting can be opposite to each other.

In accordance with the embodiment of the present invention, the step of rinsing water supplying and infiltrating supplies rinsing water, rotating the inner tub at low speed and rotates the inner tub with a remaining power for a predetermined time by stopping the operation of the driving motor so that the rinsing water is infiltrated into the washing materials when a predetermined amount of the rinsing water is supplied into the inner tub.

In accordance with the embodiment of the present invention, further includes a step of remaining power rotating and draining for exhausting the rinsing water, rotating the inner with a remaining power tub for a predetermined time under the condition that the operation of the driving motor for rotating the inner tub is stopped, after the step of rinsing water permeating and exhausting.

In accordance with the embodiment of the present invention, further includes a step of washing materials separating for rotating a pulsator so that the washing materials stuck on the wall of the inner tub can be separated through the dehydrating process for dehydrating contained in the wash water before the step of rinsing water supplying and infiltrating or after the step of rinsing water permeating and exhausting.

In accordance with the embodiment of the present invention, the step of rinsing water permeating and exhausting supplies rinsing water repeatedly performing the rotating and braking processes so that the rinsing water can be infiltrated separating the washing materials stuck on the wall of the inner tub in the step of dehydrating step for dehydrating contained in the wash water.

In accordance with the embodiment of the present invention, further includes the steps of centrifugal permeation rinsing for performing centrifugal permeation rinsing as the rinsing water falls to the inner side of the inner tub over the upper portion of the inner tub by the centrifugal force that the inner tub rotates at high speed, when the rinsing water is supplied to a predetermined level between the steps of rinsing water supplying and infiltrating and rinsing water permeating and exhausting and rinsing water draining for draining rinsing water in the inner tub and outer tub after the step of centrifugal permeation rinsing.

In accordance with the embodiment of the present invention, further includes the steps of centrifugal permeation rinsing for re-supplying the rinsing water to a water level that the operation of performing centrifugal permeation rinsing can be performed after the step of rinsing water permeating and exhausting and performing centrifugal permeation rinsing as the rinsing water falls to the inner side of the inner tub over the upper portion of the inner tub by the centrifugal force that the inner tub rotates at high speed and rinsing water dehydrating for dehydrating, at the same time that the rinsing water is drained by rotating the inner tub at high speed after the step of centrifugal permeation rinsing.

In accordance with the embodiment of the present invention, further includes the steps of rinsing by supplying rinsing water at the last rinsing step and at the same time mixing the washing materials, rotating a pulsator after repeating the steps of rinsing water supplying and infiltrating and rinsing water permeating and exhausting as a predetermined time, draining the rinsing water in the inner tub and outer tub after the above step and draining and dehydrating for infiltrating the rinsing water into the washing materials by rotating the inner tub supplying the rinsing water after the above step and directly draining and dehydrating after the rinsing water passes through the washing materials.

In accordance with the embodiment of the present invention, further includes the steps of re-supplying the rinsing water to a water level that the operation of performing centrifugal permeation rinsing can be performed after repeating the steps of rinsing water supplying and infiltrating and rinsing water permeating and exhausting as a predetermined time, mixing for mixing the washing materials by rotating a pulsator when the rinsing water is supplied to a predetermined level at the above step, centrifugal permeation rinsing for performing centrifugal permeation rinsing as the rinsing water falls to the inner side of the inner tub over the upper portion of the inner tub by the centrifugal force that the inner tub rotates at high speed after the above mixing step, repeating the step of mixing and centrifugal permeation rinsing and draining the rinsing water and draining and dehydrating for infiltrating the rinsing water into the washing materials by rotating the inner tub, supplying the rinsing water after the above step and directly draining and dehydrating after passing the rinsing water through the washing materials.

Also, In order to achieve the above objects, there is provided a rinse control method for a washing machine, including the steps of rinsing water supplying for supplying the rinsing water to a water level that the operation of centrifugal re-circulation rinsing can be performed, mixing re-circulation rinsing for performing centrifugal re-circulation rinsing as the rinsing water falls to the inner side of the inner tub over the upper portion of an inner tub at the same time that the washing materials are mixed by rotating a pulsator, when the rinsing water is supplied to a predetermined level in the rinsing water supplying step, draining for draining rinsing water in the inner tub and outer tub after performing the mixing re-circulation rinsing step and draining and dehydrating for infiltrating the rinsing water into the washing materials by rotating the inner tub, supplying the rinsing water after the above step and directly draining and dehydrating after passing the rinsing water through the washing materials.

In accordance with the embodiment of the present invention, the mixing rinsing step in which the pulsator rotates at low speed and the centrifugal re-circulation rinsing step in which the pulsator rotates at high speed are processed simultaneously in the mixing re-circulation rinsing step.

In accordance with the embodiment of the present invention, the mixing rinsing step in which the pulsator rotates at low speed is processed first and then the centrifugal re-circulation rinsing step in which the pulsator rotates at high speed is processed.

With the rinse control method for a washing machine, can reduce waste of rinsing water and simultaneously improve rinsing efficiency shortening rinsing time, by infiltrating rinsing water into washing materials supplying water and rotating the inner tub simultaneously, and discharging bubbles and detergent together with the rinsing water by rotating the inner tub at high speed.

BRIEF DESCRIPTION OF THE DRAWINGS

FIG. 6 is a flow chart illustrating the rinse control method for a washing machine in accordance with a third embodiment of the present invention.

FIG. 7 is a flow chart illustrating the rinse control method for a washing machine in accordance with a fourth embodiment of the present invention.

FIG. 9 is a flow chart illustrating the rinse control method for a washing machine in accordance with a fifth embodiment of the present invention.

FIG. 25 is a flow chart illustrating the rinse control method for a washing machine in accordance with a sixteenth embodiment of the present invention.

MODE FOR CARRYING OUT THE PREFERRED EMBODIMENTS

The present invention will now be described with reference to accompanying drawings.

Figure 4:
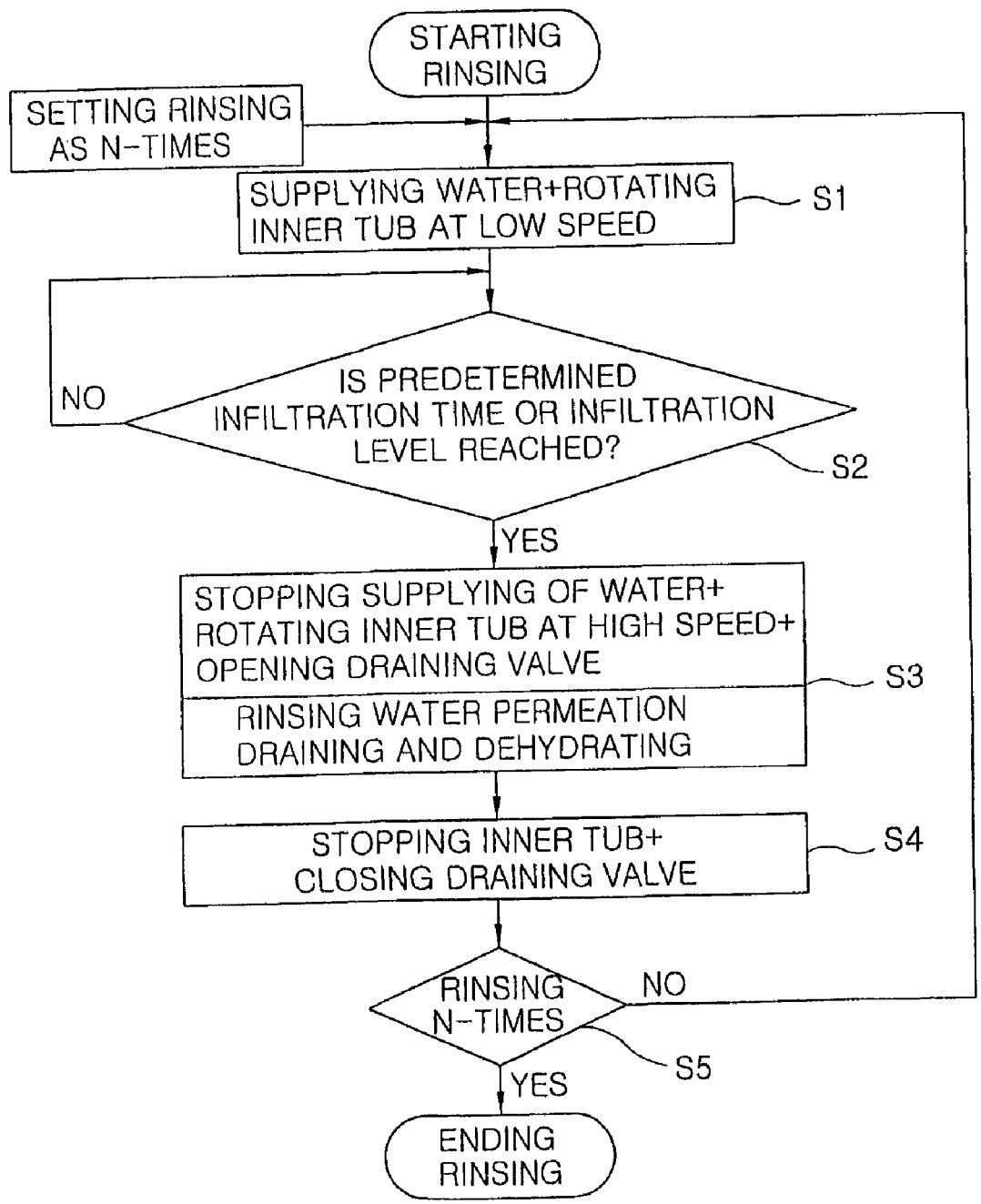
FIG. 4 is a flow chart illustrating a rinse control method for a washing machine in accordance with a first embodiment of the present invention.

FIG. 4 is a flow chart illustrating a rinse control method for a washing machine in accordance with a first embodiment of the present invention.

The rinse control method for a washing machine in accordance with the present invention will be described with reference to FIGS. 1 and 4.

Firstly, the operation of rinsing water supplying and infiltrating is performed by supplying rinsing water rotating the inner tub at low speed by controlling a driving motor to be operated at a speed to infiltrate the rinsing water into washing materials ($S_1$).

Here, the reason that the inner tub is rotated at low speed is that since if the rinsing water is supplied when the inner tub 23 is rotated at high speed, the washing materials are rotated at high speed together with the inner tub 23, the rinsing water is bumped into the washing materials and sputtered and the rinsing water can not be infiltrated.

Therefore, the inner tub 23 is rotated at low speed so that the rinsing water is infiltrated into the washing materials and the rotation speed at this time can be varied according to the system or water supplying pressure, but conventionally, the rinsing water can be smoothly infiltrated into the washing materials when the inner tub is rotated at lower speed than 300 rpm under the condition that the diameter of the inner tub 23 is about 525 mm.

It is desirable that the rotation speed of the inner tub 23 is set as 100 rpm to optimize the condition that the rinsing water is infiltrated into the washing materials best.

Also, as described above, the infiltration operation of the rinsing water can be embodied by gradually increasing the rotation speed of the inner tub 23 to 300 rpm for the initial driving, without limiting the rotation speed of the inner tub 23 as a predetermined rotation speed.

It is desirable that the amount of supplied rinsing water or infiltration operating time are set differently according to the amount of washing materials in operating such infiltration of the rinsing water and when the predetermined level of the rinsing water or the infiltration setting time is passed ($S_2$), the operation of rinsing water permeating and exhausting is started.

Then, in the operation of rinsing water permeating and exhausting, the rinsing water is drained rotating the inner tub 23 at a speed that the rinsing water infiltrated into the washing materials passes the washing materials and exhausted to the outside ($S_3$).

At this time, supply of the rinsing water is stopped and the draining valve 27 is opened so that the rinsing water can be exhausted.

In such an operation of rinsing water permeating and exhausting, the washing materials and rinsing water receive a force to be drained to the outside by the centrifugal force, when the speed is higher than the speed that the inner tub 23 is rotated, in operating rinsing water supplying and infiltrating.

The washing materials are limited to be moved being caught on the wall of the inner tub 23, but the infiltrated rinsing water is drained passing through a cloth net and at this time, stained dregs, contaminated materials, detergent, bubbles are separated and drained to the outer tub 21 through a hole of the inner tub 23 by the force that the rinsing water is permeated and drained.

The rinsing water containing contaminants, bubbles and the like, drained to the outer tub 21 is exhausted to the outside through a draining hose 26.

The rotation speed of the inner tub 23 in the operation of rinsing water permeating and exhausting is higher than 200 rpm with which the rinsing water is permeated through the cloth net of the washing materials and more preferably, it is desirable that the speed is increased to the rotation speed in case of the conventional dehydrating operation.

Then, when the operation of rinsing water permeating and exhausting is completed as the rinsing water infiltrated into the washing materials is dehydrated, the inner tub is stopped by stopping the operation of the driving motor 40 and the draining valve 27 is closed ($S_4$). The rinsing stroke is completed when the rinsing operation as a predetermined time is ended ($S_5$) by repeating an rinsing stroke identical as the above operation as the predetermined number of times of the rinsing stroke Therefore, with the rinse control method in accordance with the first embodiment of the present invention, draining and dehydrating operations are performed right after the supplied rinsing water is infiltrated into the washing materials and accordingly, rinsing operation is performed without filling the rinsing water to a predetermined level in the outer and inner tubs, thus to reduce waste of the rinsing water.

Also, in the rinse method, water supplying, mixing rinsing, draining and dehydrating operations are performed continuously without being separated, thus to reduce considerable amount of time for the rinsing stroke.

Figure 5:
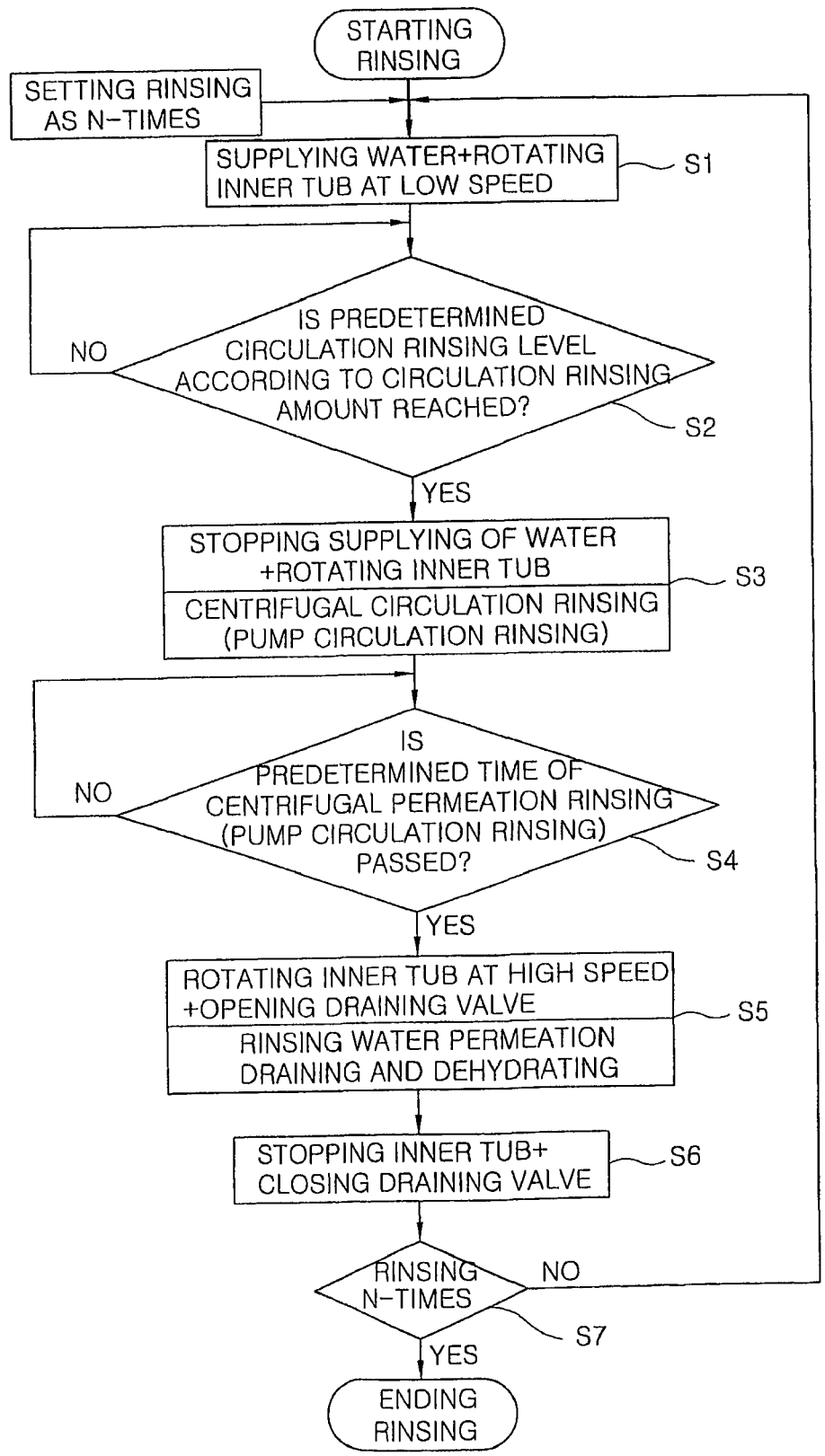
FIG. 5 is a flow chart illustrating the rinse control method for a washing machine in accordance with a second embodiment of the present invention.

FIG. 5 is a flow chart illustrating the rinse control method for a washing machine in accordance with a second embodiment of the present invention.

The rinse control method for the washing machine in accordance with the second embodiment of the present invention will be described with reference to FIGS. 1, 2 and 5.

First, when the rinsing stroke is started, the operation of rinsing water supplying and infiltrating is performed so that the rinsing water can be infiltrated into the washing materials by supplying the rinsing water rotating the inner tub 23 at low speed ($S_1$).

When the amount of the rinsing water applied to the outer tub 21 reaches to a predetermined level for circulation rinsing performing the operation of rinsing water supplying and infiltrating ($S_2$), supplying of water is stopped and circulation rinsing operation is performed ($S_3$).

Figure 1:
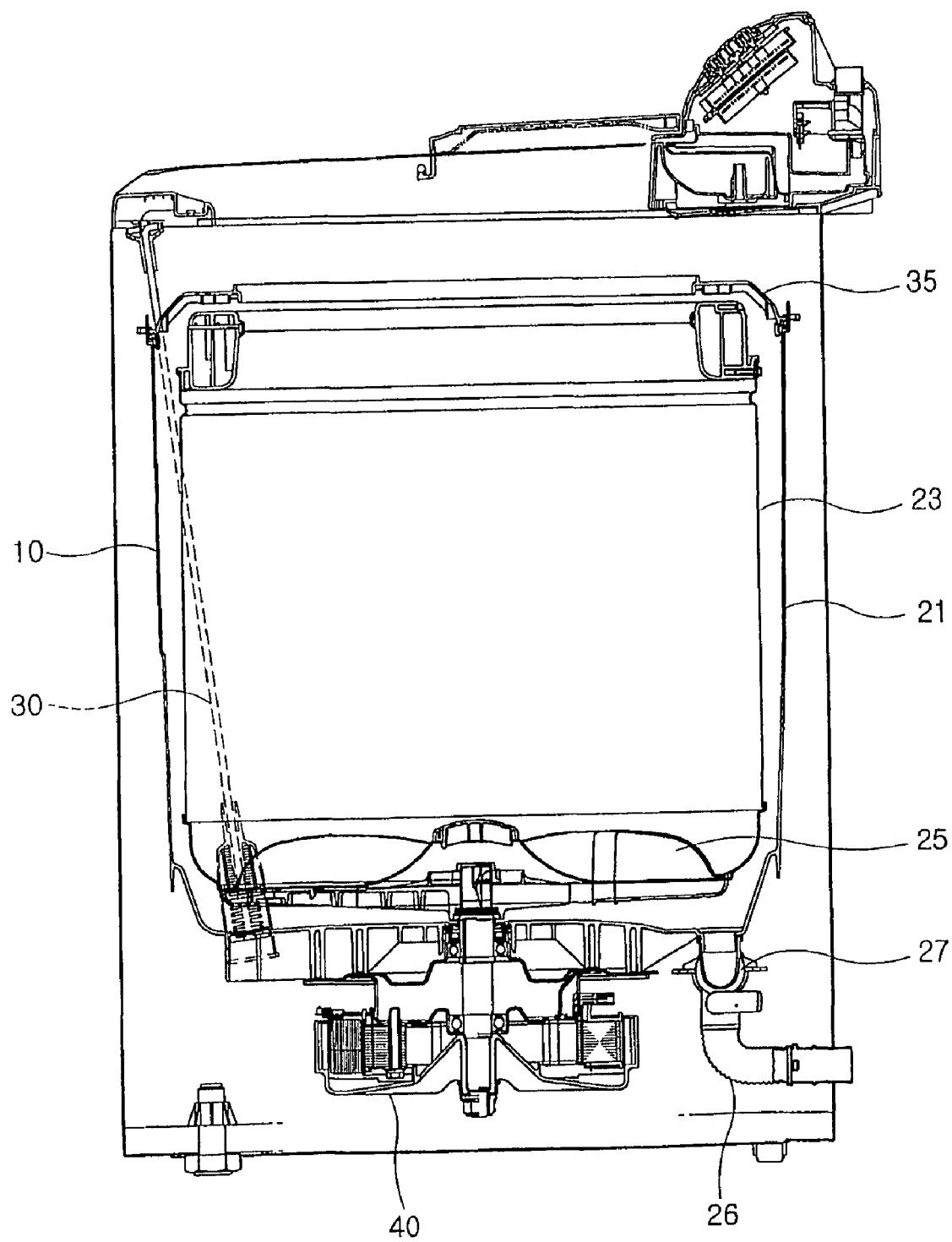
FIG. 1 is a cross-sectional view showing a motor direct drive washing machine.

At this time, the motor direct driving washing machine shown in FIG. 1 controls the driving motor 40 and rotates at a high speed that the rinsing water can be infiltrated into the washing materials, rotating the inner tub 23 at low speed.

Figure 2:
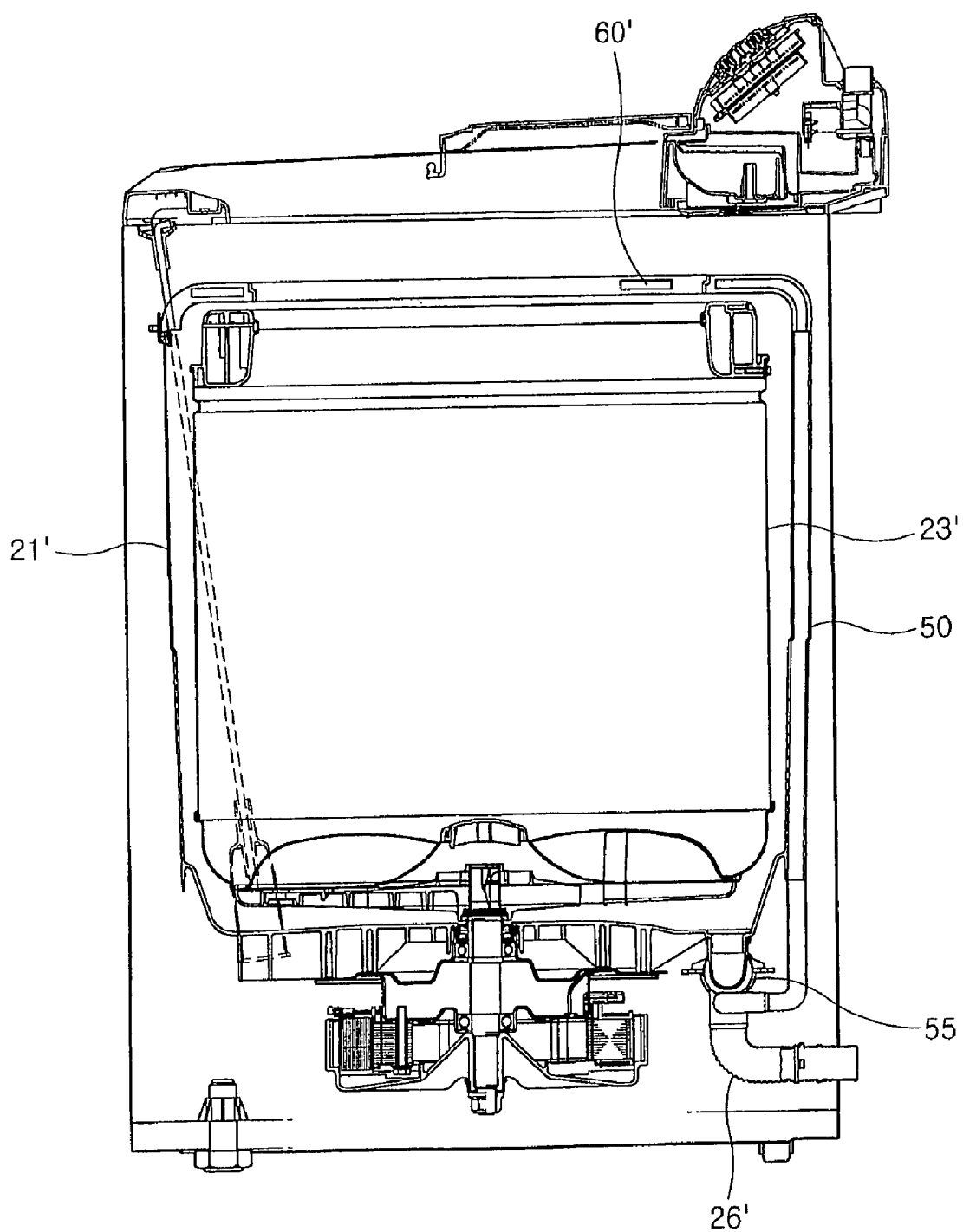
FIG. 2 is a cross-sectional view showing a washing machine in which a pump circulation apparatus is installed in the motor direct driving washing machine.
Figure 3:
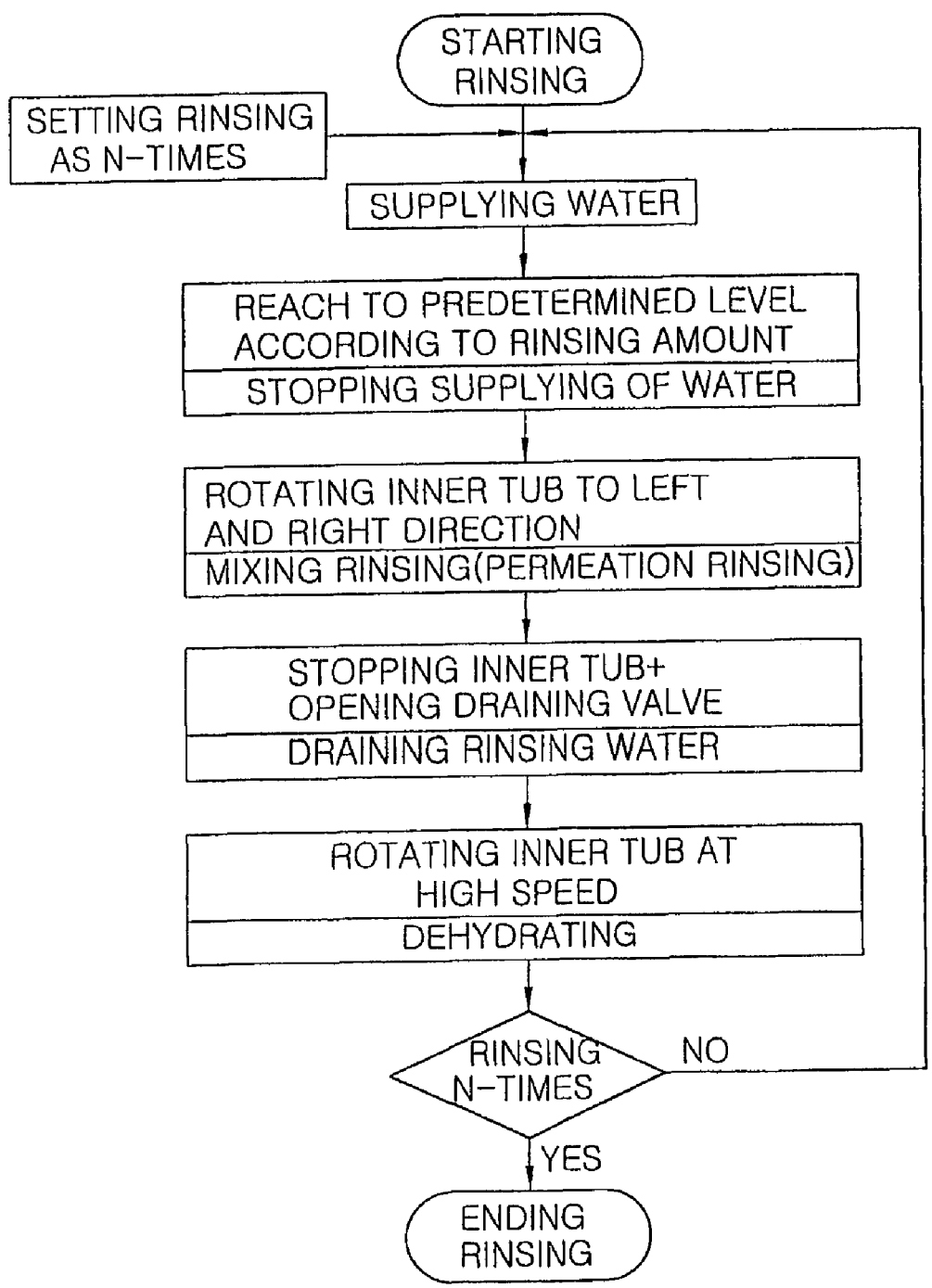
FIG. 3 is a flow chart illustrating the rinse method in accordance with the conventional art achieved in the above motor direct washing machine.

Also, as shown in FIG. 2, the washing machine having a pump circulation apparatus rotates the inner tub 23' at a predetermined speed and at the same time exhausts rinsing water in the outer tub 21' to the inner side of the inner tub 23' through the circulation hose 50 and exhaust opening 60 by operating the circulation pump 55, thus to operate circulation rinsing operation.

With such centrifugal circulation rinsing and pump circulation rinsing operations, rinsing efficiency can be improved by repeating the operation that the rinsing water infiltrated to the washing materials pass through cloth net of the washing materials by the centrifugal force that the inner tub 23 rotates and then is infiltrated into the washing materials as the rinsing water is exhausted from the upper portion of the inner tub 23 again, and separating foreign materials, detergent and the like stained on the washing materials.

As the circulation rinsing process is operated, when a predetermined time is passed ($S_4$), the draining value 27 is opened and at the same time, the operation of rinsing water permeating and exhausting for simultaneously draining rinsing water and foreign materials by rotating the inner tub 23, and dehydrating ($S_5$).

At this time, contaminated material and bubbles including the rinsing water are exhausted to the outside through the draining hose 26.

When the operation of rinsing water permeating and exhausting is completed, the inner tub is stopped by stopping the operation of the driving motor 40, the draining valve 27 is closed ($S_6$) and the rinsing stroke is performed as the predetermined time ($S_7$) by determining whether the rinsing operation is conducted, thus to complete the rinsing stroke.

With the rinse control method for a washing machine in accordance with the second embodiment of the present invention operated as above, the rinsing efficiency of the washing materials using small amount of water and rinsing time can be reduced, since the process for circulating and permeating the rinsing water for a predetermined time after infiltrating the supplied rinsing water is repeated and the draining and dehydrating operation is processed.

FIG. 6 is a flow chart illustrating the rinse control method for a washing machine in accordance with a third embodiment of the present invention.

The rinse control method for a washing machine in accordance with the third embodiment of the present invention will be described with reference to FIGS. 1 and 6.

First, the operation of rinsing water supplying and infiltrating is performed so that the rinsing water can be infiltrated into the washing materials by supplying the rinsing water rotating the inner tub 23 at low speed ($S_1$).

When the set level of the rinsing water is reached or the infiltration set time is passed ($S_2$), the rotation speed of the inner tub 23 is raised and the operation of draining of rinsing water is performed opening the draining valve simultaneously.

At this time, the draining operation of rinsing water is performed under the condition that the rinsing water is continuously supplied and the operation of water supplying and draining and permeation rinsing that the rinsing water supplied to the inside of the inner tub 23 is drained passing through the washing material.

In the above operation, the amount of the drained rinsing water must be larger than the amount of the supplied rinsing water.

In the process of the operation of water supplying and draining and permeation rinsing, when the amount of the rinsing water is lowered to a predetermined level or a predetermined time is passed ($S_4$), supply of water is stopped and the draining and dehydrating operations are performed as the inner tub 23 rotates at higher speed.

Then the inner tub 23 is stopped, the draining valve 27 is closed ($S_6$) and the rinsing stroke is completed when the rinsing stroke operated as above is repeated as a predetermined time ($S_7$).

With the rinse control method for washing machine, since the rinsing water is supplied to the washing materials rotating the inner tub and the dehydrating operation is processed after the operation of water supplying and draining and permeation rinsing is performed under the condition that the draining valve is opened, waste of the rinsing water can be reduced, the rinsing efficiency is improved and rinsing time can be reduced.

Figure 8A:
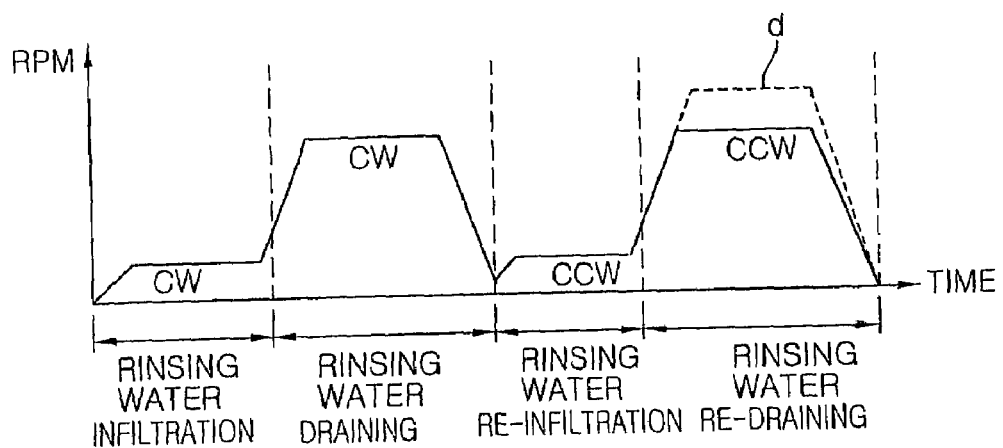
FIGS. 8A, 8B and 8C are graphs showing changes in rotation direction and speed of the inner tub in accordance with the fourth embodiment of the present invention.
Figure 8B:
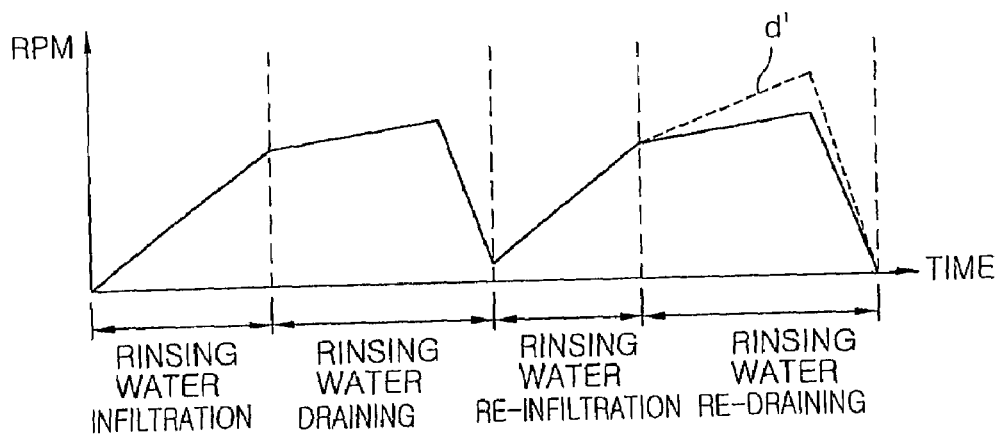
Figure 8C:
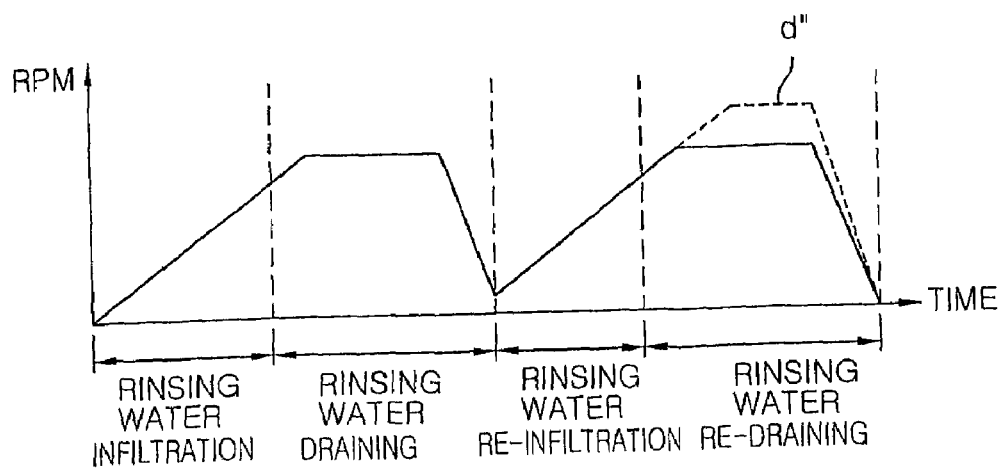

FIG. 7 is a flow chart illustrating the rinse control method for a washing machine in accordance with a fourth embodiment of the present invention. FIGS. 8A, 8B and 8C are graphs showing changes in rotation direction and speed of the inner tub in accordance with the fourth embodiment of the present invention.

The rinse control method for a washing machine in accordance with the fourth embodiment of the present invention will be described with reference to FIGS. 1 and 7. The operation of rinsing water infiltration is performed for supplying the rinsing water into the inner tub 23 rotating the inner tub 23 in a direction at a low speed so that the rinsing water can be infiltrated into the washing material.

It is desirable that the amount of supplied rinsing water or time for operating infiltration is set differently according to the rinsing amount in the operation.

Then, when the infiltration setting time is passed or the infiltration setting level is reached, according to the rinsing amount, the rinsing water infiltrated into the washing materials passes through the washing materials and the operation of rinsing water exhaust for draining the rinsing water rotating the inner tub 23 at high speed in the direction same as that of the rotation in the above operation is performed.

At this time supply of the rinsing water can be stopped and the draining valve 27 is opened so that the rinsing water can be exhausted.

In such operation of rinsing water exhaust, when the inner tub 23 is rotated at higher speed than that of the outer tub, a force that the rinsing water is exhausted out of the inner tub 23 together with the washing materials by the centrifugal force is generated.

It is desirable that the rotation speed of the inner tub 23 in the operation of rinsing water exhaust is raised from higher than 200 rpm with which the rinsing water is permeated through the cloth net of the washing materials to the rotation speed of the conventional dehydration operation.

Then, when the rinsing water infiltrated into the washing materials is dehydrated and the operation of rinsing water exhaust is completed, the operation of rinsing water re-infiltration for rotating the inner tub 23 to the reverse direction which is opposite to the rotation direction of the above inner tub 23 at low speed and supplying the rinsing water is performed so that the rinsing water can be infiltrated into the washing materials again.

Here, when the operation of rinsing water infiltration is performed rotating the inner tub 23 in the reverse direction, the washing materials which lump in the step of rinsing water exhaust ($S_2$) become disentangled to a certain degree and the passage of the newly supplied rinsing water is differentiated from the passage where the rinsing water passed the cloth textile of the washing materials in the above steps ($S_1$) and ($S_2$).

In conclusion, the rinsing water is infiltrated into the cloth textile of the washing materials through another passage in the step of rinsing water re-infiltration which is performed as the inner tub 23 is rotated in the reverse direction and accordingly the rinsing water is infiltrated to the washing materials evenly, thus to improve rinsing efficiency.

Then, when the rinsing water is infiltrated into the washing material, the operation of rinsing water exhaust for draining the rinsing water and dehydrating, rotating the inner tub 23 in the same direction so that the rinsing water infiltrated into the washing materials passes through the washing materials is performed.

At this time, supply of the rinsing water is stopped and the draining valve 27 is remained to be opened so that the rinsing water can be exhausted.

As the operation of rinsing water exhaust is processed for a predetermined time, the operation of the driving motor 40 is stopped and the inner tub 23 is stopped, thus to close the draining valve 27 ($S_5$). Then, the above rinsing stroke is repeated as the predetermined number of times for the rinsing stroke and when the rinsing operation is finished, the rinsing stroke is completed.

On the other hand, the rinsing operation can be performed supplying the rinsing water continuously from the step of rinsing water infiltration ($S_1$) to the step of rinsing water re-infiltration ($S_3$).

On the contrary, the rinsing operation can be performed supplying the rinsing water in the steps of rinsing water infiltration ($S_1$) and rinsing water re-infiltration ($S_3$) and stopping the supply of the rinsing water in the steps of rinsing water exhaust ($S_2$) and rinsing water re-exhaust ($S_4$).

Also, the draining valve 27 can be opened from the step of rinsing water infiltration ($S_1$) to the step of rinsing water re-exhaust ($S_4$). It is desirable that the exhaust amount of rinsing water is smaller than the supply amount of the same so that the rinsing water can be infiltrated sufficiently to the washing materials in the steps of rinsing water infiltration ($S_1$) and rinsing water re-infiltration ($S_3$).

On the contrary, the draining valve 27 can be controlled to be closed in the steps of rinsing water infiltration ($S_1$) and rinsing water re-infiltration ($S_3$) and opened in the steps of rinsing water exhaust ($S_2$) and rinsing water re-exhaust ($S_4$).

On the other hand, as in FIG. 8A, in the fourth embodiment of the present invention, the rotation speed of the inner tub 23 in the steps of rinsing water infiltration ($S_1$), rinsing water exhaust ($S_2$), rinsing water re-infiltration ($S_3$), and rinsing water re-exhaust ($S_4$) can be set as a predetermined speed for a predetermined time.

For sure, the rotation speed of the inner tub 23 in the steps of rinsing water exhaust ($S_2$) and ($S_4$) is set higher than that of the inner tub 23 in the steps of rinsing 9 water infiltration ($S_1$) and ($S_3$).

Also, as in FIG. 8B, the rotation speed of the inner tub 23 in the steps of rinsing water infiltration ($S_1$), rinsing water exhaust ($S_2$), rinsing water re-infiltration ($S_3$), and rinsing water re-exhaust ($S_4$), can be set gradually accelerated.

Namely, the rinsing operation can be embodied gradually increasing the rotation speed of the inner tub 23 from the initial driving speed to the speeds of exhaust and dehydration of rinsing water without limiting the rotation speed of the inner tub 23 as a predetermined rotation speed.

Also, as in FIG. 8C, the rotation speed of the inner tub 23 in the steps of rinsing water infiltration ($S_1$) and rinsing water re-infiltration ($S_3$), is gradually accelerated and the rotation speed of the inner tub 23 in the steps of rinsing water exhaust ($S_2$) and rinsing water re-exhaust ($S_4$), can be controlled to a predetermined speed for a predetermined time.

The rotation speed of the inner tub 23, in the last step of re-exhausting rinsing water ($S_4$) in the above rinsing stroke, can be set higher than the rotation speed of the inner tub 23 in the step of exhausting the rinsing water as shown in "d" in FIGS. 8A, 8B and 8C.

Therefore, with the rinse control method in accordance with the fourth embodiment of the present invention, draining and dehydrating operations are performed right after the supplied rinsing water is infiltrated into the washing materials and accordingly, rinsing operation is performed without filling the rinsing water to a predetermined level in the outer and inner tubs 21 and 23, thus to reduce waste of the rinsing water.

Also, in the rinse method, water supplying, mixing rinsing, draining and dehydrating operations are performed continuously without being separated, thus to reduce considerable amount of time for the rinsing stroke.

Particularly, since the rinsing operation is performed rotating the inner tub 23 in the opposite direction to that of the inner tub 23 of the former step, according to the rinsing step, the rinsing water can be infiltrated more uniformly to the washing materials, thus to improve the rinsing efficiency.

Figure 10A:
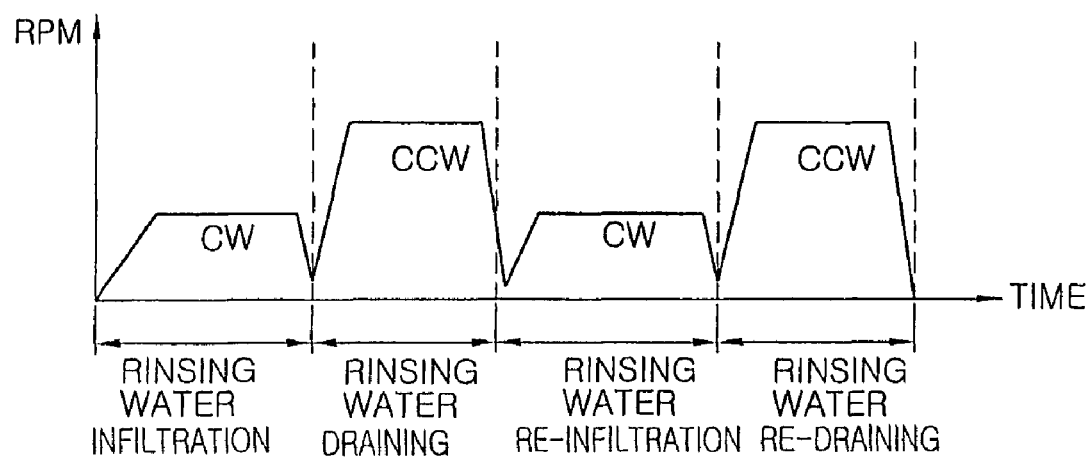
FIGS. 10A and 10B are graphs showing changes in rotation direction and speed of the inner tub in accordance with the fifth embodiment of the present invention.
Figure 10B:
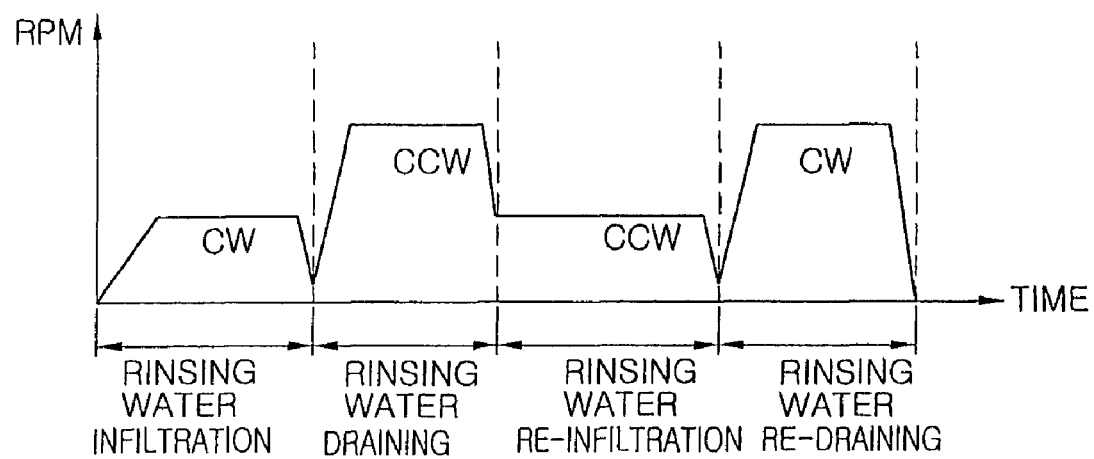

FIG. 9 is a flow chart illustrating the rinse control method for a washing machine in accordance with the fifth embodiment of the present invention and FIGS. 10A and 10B are graphs showing changes in rotation direction and speed of the inner tub in accordance with the fifth embodiment of the present invention.

The rinse control method for a washing machine in accordance with the fifth embodiment of the present invention will be described with reference to FIGS. 1, 9, 10A and 10B. The process of the operation includes the steps of rinsing water infiltration ($S_1$), rinsing water exhaust ($S_2$), rinsing water re-infiltration ($S_3$), and rinsing water re-exhaust ($S_4$).

As in FIG. 10A, the direction of rotation of the inner tub 23 in the step of rinsing water infiltration ($S_1$) is same as in the step of rinsing water re-infiltration ($S_3$) and the directions of rotation of the inner tub 23 in the steps of rinsing water exhaust ($S_2$) and rinsing water re-exhaust ($S_4$) are different to each other.

Also, in FIG. 10B, the inner tub is rotated in one direction in the step of rinsing water infiltration ($S_1$), in the reverse direction in the step of rinsing water exhaust ($S_2$) and in the same direction of the former step in the step of rinsing water re-infiltration ($S_3$). In the step of rinsing water re-exhaust ($S_4$), the inner tub 23 can be set to rotate in the reverse direction again.

In the fifth embodiment of the present invention, passage of the rinsing water infiltrated into the cloth textile of the washing materials is formed variously by setting the direction of rotation of the inner tub 23 differently according to the rinsing steps, thus to improve rinsing efficiency in processing rinsing operation.

Figure 11:
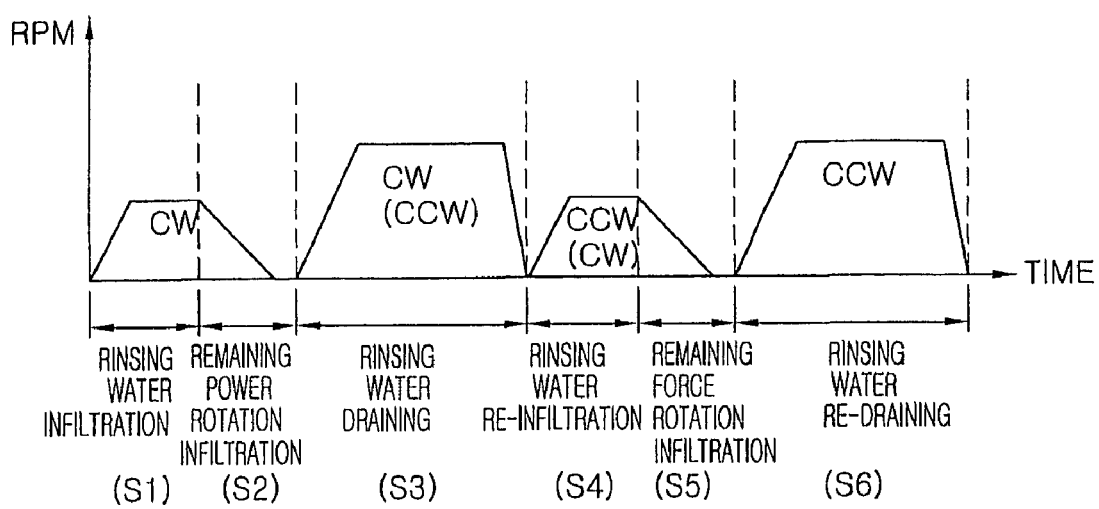
FIG. 11 is a flow chart illustrating the rinse control method for a washing machine in accordance with a sixth embodiment of the present invention.

FIG. 11 is a flow chart illustrating the rinse control method for the washing machine in accordance with the sixth embodiment of the present invention.

In the rinse control method for a washing machine in accordance with the sixth embodiment of the present invention, the rinsing water is supplied ($S_1$) rotating the inner tub 23 at low speed, and when the rinsing water is supplied into the inner tub 23 as the predetermined amount, the operation of the driving motor 40 for rotating the inner tub for a predetermined time so that the rinsing water can be sufficiently infiltrated into the washing materials is stopped ($S_2$).

At this time, as in FIG. 11, the operation of infiltrating rinsing water can be performed rotating the inner tube 23 lowering the speed with the remaining power by the rotation inertia, under the condition that the operation of the driving motor 40 is stopped. On the contrary, the rinsing water can be controlled to be infiltrated under the condition that the driving motor 40 and inner tub 23 are stopped together.

Then, when the infiltration by the remaining power infiltration of the rinsing water is finished, the inner tub 23 is rotated at higher speed, thus to exhaust the rinsing water ($S_3$).

Then, the operations of rinsing water infiltration ($S_4$), remaining power infiltration ($S_5$) and rinsing water exhaust ($S_6$) are repeated and at this time, it is desirable that the direction of rotation of the inner tub 23 is set opposite to that in the initial operation processes ($S_1$), ($S_2$) and ($S_3$).

In the rinse control method for a washing machine in accordance with the seventh embodiment of the present invention, the rinsing water is infiltrated rotating the inner tub 23 and the rinsing water is completely infiltrated into the washing materials under the condition that the rotation driving of the inner tub 23 is stopped. Therefore, energy for driving the inner tub can be saved and the rinsing water can be smoothly infiltrated into the washing material.

Figure 12:
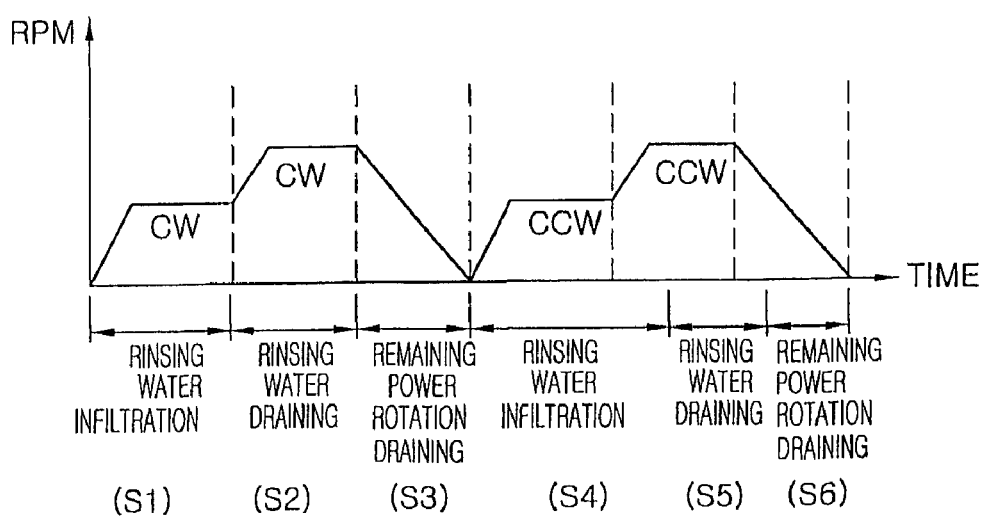
FIG. 12 is a flow chart illustrating the rinse control method for a washing machine in accordance with a seventh embodiment of the present invention.

FIG. 12 is a flow chart illustrating the rinse control method for the washing machine in accordance with the seventh embodiment of the present invention.

In the rinse control method for a washing machine in accordance with the seventh embodiment of the present invention, the rinsing water is supplied rotating the inner tub 23 in one direction at low speed so that the rinsing water can be infiltrated into the washing material. When the rinsing water is infiltrated into the washing material, supply of the rinsing water is stopped and the rinsing water is exhausted rotating the inner tub 23 in one direction so that the rinsing water infiltrated into the washing materials can be exhausted into the outside passing through the washing materials ($S_2$).

As the operation of exhausting the rinsing water rotating the inner tub 23 at high speed for a predetermined time, the rinsing water is exhausted under the condition that the operation of the driving motor 40 for rotating the inner tub is stopped.

Then, when the exhaust of the rinsing water infiltrated into the washing materials is completed, the rinsing water 23 is supplied ($S_4$) rotating the inner tub 23 in the opposite direction to the direction of rotation of the inner tub in the operation of rinsing water infiltration ($S_1$) at low speed. Then, supply of the rinsing water is stopped and the rinsing water is exhausted rotating the inner tub 23 at high speed so that the rinsing water infiltrated into the washing materials can be exhausted to the outside through the washing materials ($S_5$).

Then, after a predetermined time, the rinsing water is exhausted by the remaining power that the inner tub 23 is rotated by the inertia under the condition that the operation of the driving motor 40 for rotating the inner tub 23 is stopped, thus to complete the rinsing stroke ($S_6$).

With the rinse control method for a washing machine in accordance with the seventh embodiment of the present invention, the rinsing water is exhausted by the remaining power under the condition that the rotation driving of the inner tub 23 is stopped and accordingly, the energy for driving the inner tub 23 can be saved and since the rinsing operation is performed rotating the inner tub 23 in the opposite direction to the former direction, the rinsing water is exhausted after being infiltrated more evenly to the washing material, thus to improve rinsing efficiency.

Figure 13:
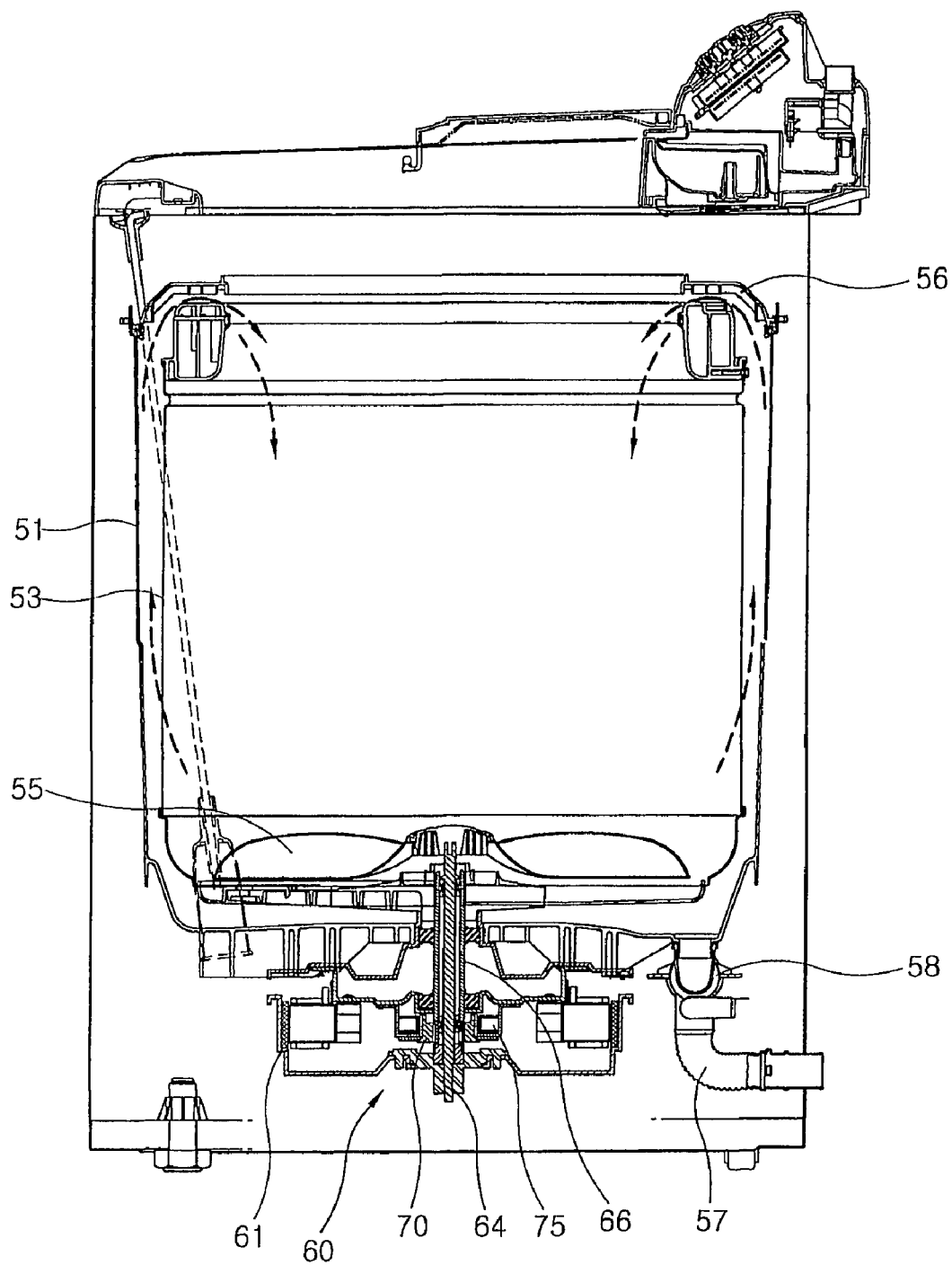
FIG. 13 is a cross-sectional view showing a washing machine in which the rinse control method is applied in accordance with eighth to fourteenth embodiments of the present invention.

FIG. 13 is a cross-sectional view showing a washing machine in which the rinse control method is applied in accordance with eighth to fourteenth embodiments of the present invention.

As shown in FIG. 13, the double shaft direct drive washing machine is composed to rotate a pulsator 55 in the inner tub 53 by the driving apparatus 60 installed at the lower portion of the outer tub 51 or rotate the pulsator 55 and inner tub 53 as a single body.

The driving apparatus 60 enabling the above operation includes a driving motor 61 for generating a rotation power; a pulsator shaft 64 connected to the pulsator 55 in the middle of the driving motor 61, for transmitting rotational force to the pulsator 55; a tub shaft 66 inserted in the outside of the pulsator shaft 64 having a bearing in-between, for transmitting rotational force into the inner tub 53; and a clutch instrument 70 installed between the tub shaft 66 and driving motor 61, for controlling the power transmitted from the driving motor 61 to the tub shaft 66.

Here, the clutch instrument 70 includes a clutch gear 71 which rotates, being combined to the rotor 63 and pulsator shaft 64 at the lower position of the tub shaft 66; a slider 73 combined to the clutch gear 71, for transmitting rotational force to the tub shaft 66, in case it is combined to the lower portion of the tub shaft 66 movably and moves to the lower side; and a solenoid 75 installed in a bearing housing positioned at the upper side of the slider 73, for moving the slider 73 to the upper or lower direction.

In the clutch instrument 70, the slider 73 moves downwardly when the solenoid is turned off to connect the clutch gear 71 and tub shaft 66, and a rotation driving force is transmitted to the pulsator 55 and inner tub 53, thus to rotate them as a single body.

When the solenoid 75 is turned on, the slider 75 moves upwardly by the magnetic power and is separated from the clutch gear 71. At this time, the rotational force of the clutch gear 71 is not transmitted to the tub shaft 66, and therefore the pulsator rotates.

On the other hand, a tub cover 56 is installed at the upper portion of the outer tub 51 so that the operation of centrifugal permeation rinsing can be performed as water flow moved upwards along the wall of the outer tub 51 falls to the inner side of the inner tub 53 again by the centrifugal force, according to rotation of the inner tub 53.

Various embodiments in accordance with the present invention, which are applied to various types of washing machines including such double shaft direct drive washing machine will be described with reference to FIGS. 14 to 22.

Figure 14:
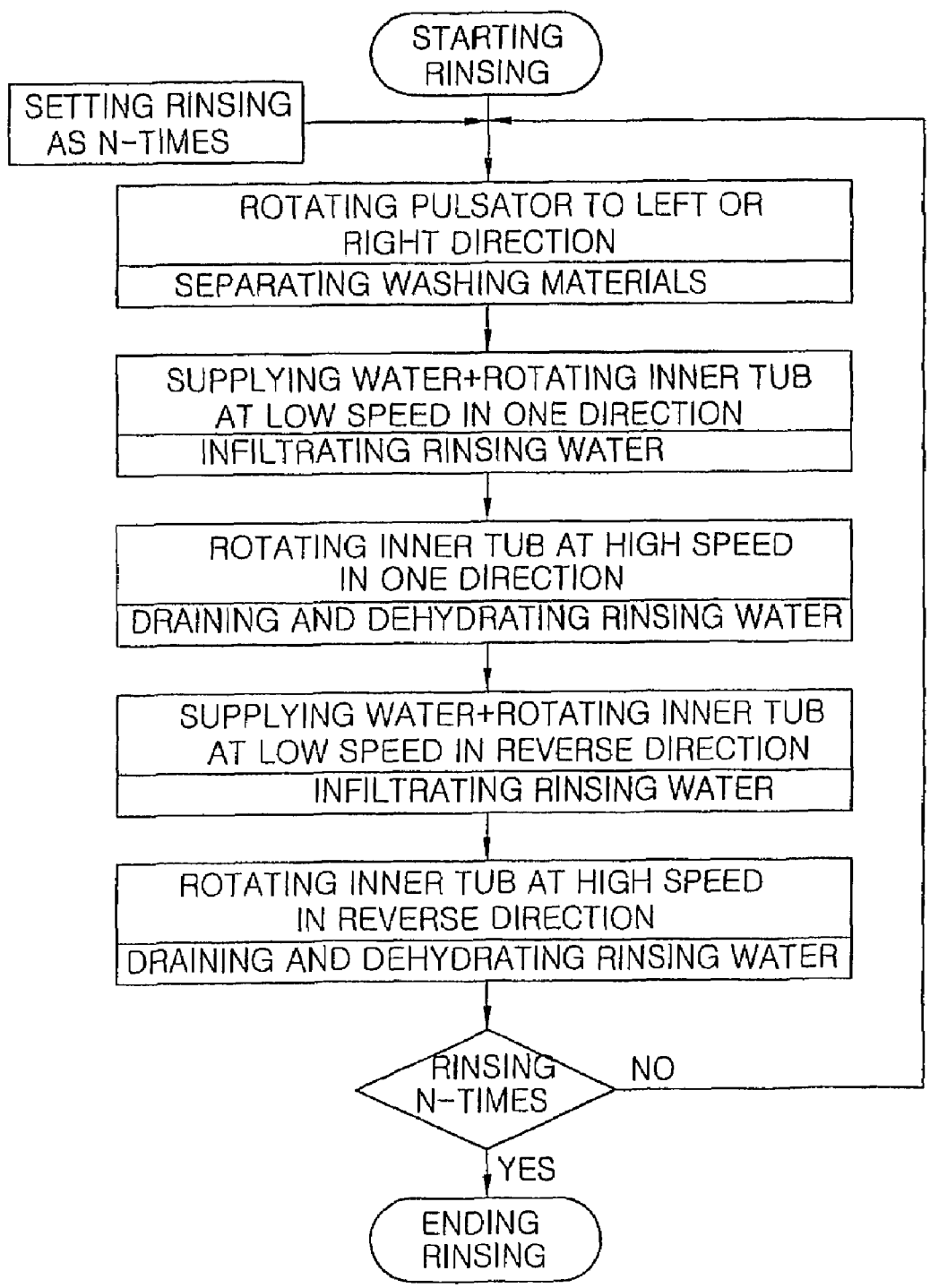
FIG. 14 is a flow chart illustrating the rinse control method for a washing machine in accordance with an eighth embodiment of the present invention.
Figure 15:
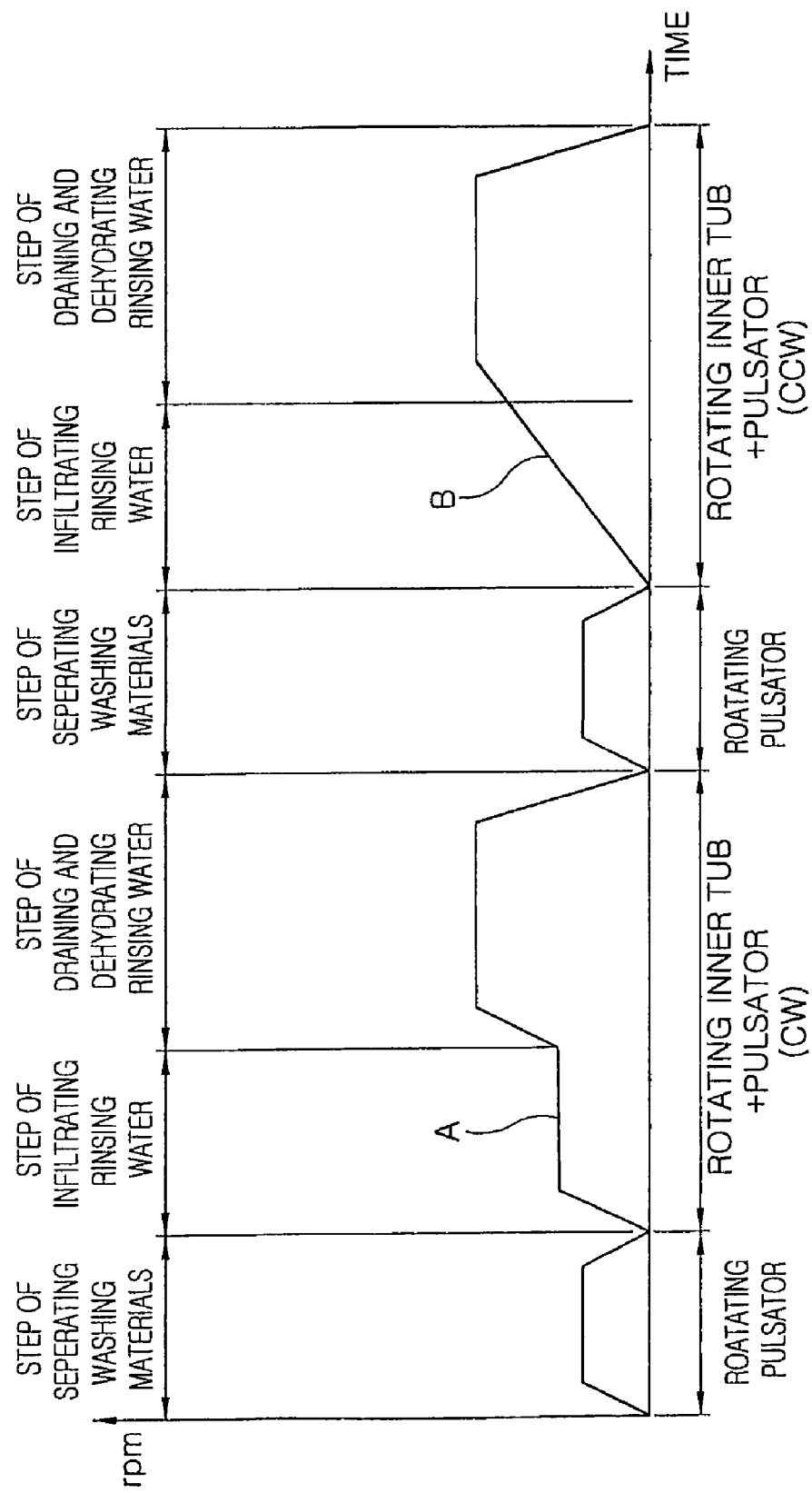
FIG. 15 is a graph illustrating changes in rotation speed of the inner tub in accordance with the eighth embodiment of the present invention.

FIG. 14 is a flow chart illustrating the rinse control method for a washing machine in accordance with an eighth embodiment of the present invention and FIG. 15 is a graph illustrating changes in rotation speed of the inner tub in accordance with the eighth embodiment of the present invention.

With the rinse control method for a washing machine in accordance with the eighth embodiment of the present invention, the pulsator 55 is rotated so that the washing materials stuck on the wall of the inner tub 53 can be divided in the dehydrating step for dehydrating contained in wash water ($S_1$).

Namely, when the dehydrating operation, in case of dehydrating step in the washing stroke or rinsing stroke of the former step, is finished, the washing materials are dehydrated by the high-speed rotation of the inner tub 53, thus to be stuck on the inner surface of the inner tub 53.

At this time, the following operation of infiltration of rinsing water can be performed smoothly by separating the washing materials from the inner surface of the inner tub 53 by rotating the pulsator 55.

Here, a small amount of rinsing water can be supplied in the process for separating the washing materials by rotating the pulsator 55.

In the operation of rotating the pulsator 55 only, the pulsator 55 can be rotated without rotating the inner tub 53 when the driving motor 61 is operated by separating the slider 75 from the clutch gear 71 by turning on the solenoid 75, with reference to FIG. 13.

Then, the rinsing water is supplied rotating the inner tub 53 in one direction so that the rinsing water can be infiltrated to the washing materials separated in the former step ($S_2$).

Here, the reason that the inner tub 53 is rotated at low speed is that the rinsing water can not be permeated into the washing materials well as the rinsing water is bumped into the washing materials and sputtered since the washing materials are rotated at high speed together with the inner tub 53 when the inner tub 53 rotates at high speed.

Therefore, the inner tub 53 is rotated at low speed so that the rinsing water can be infiltrated into the washing materials and the rotation speed can be changed by system or water supplying pressure, but conventionally, the rinsing water can be permeated into the washing materials when the diameter of the inner tub 53 is about 525 mm and inner tub 53 is rotated at lower than 300 rpm.

It is desirable that the optimum rotation speed that the rinsing water can be infiltrated into the washing materials well is set about 100 rpm.

Also, as in FIG. 15, the operation of rinsing water infiltration can be embodied, gradually raising the rotation speed of the inner tub 53 to about 300 rpm in the initial driving, without limiting the rotation speed of the inner tub 53 to a predetermined speed.

Then, the rinsing water is drained and dehydrated, rotating the inner tub 53 at high speed so that the rinsing water infiltrated into the washing materials can be exhausted to the outside through the washing materials ($S_3$).

At this time supplying of water is stopped and the draining valve 27 is opened so that the rinsing water can be exhausted.

In the operation of rinsing water exhaust, when the inner tub 53 rotates at higher speed than that of the inner tub 53 in the operation of rinsing water infiltration, a force that drains the rinsing water together with the washing materials out of the inner tub 53 by the centrifugal force, is generated.

Therefore, movement of the washing materials is limited by being caught on the wall of the inner tub 53, but the rinsing water infiltrated into the washing materials is drained passing through the cloth net of the washing materials. At this time, by the force that the rinsing water is drained passing through the cloth net, dregs, contaminants, detergent, bubbles and the like stained on the washing materials are separated and drained to the outer tub 51 through the hole of the inner tub 53.

As described above, contaminants, bubbles and the like containing the rinsing water drained from the outer tub 51 are exhausted to the outside through the draining hose 57.

In the operation of rinsing water exhaust, it is desirable that rotation speed of the inner tub 53 is raised to higher than 200 rpm that the rinsing water passes through the cloth net of the washing material, conventionally, to the rotation speed in case of dehydrating operation.

Then, the operations of separating the washing materials by rotating the pulsator 55 ($S_4$), supplying rinsing water rotating the inner tub at low speed so that the rinsing water can be infiltrated into the separated washing materials ($S_5$) and draining and dehydrating the rinsing water rotating the inner tub 53 at high speed ($S_6$) are repeated.

However, the rotation direction of the inner tub 53 in the steps of supplying rinsing water infiltration ($S_5$) and rinsing water draining and dehydrating ($S_6$), is opposite to that of the inner tub 53 in the steps of rinsing water infiltration ($S_2$) and rinsing water draining and dehydrating ($S_3$) in the former steps.

On the other hand, in the steps of rinsing water infiltration ($S_2$) and ($S_5$), the inner tub 53 can continuously rotate at a uniform speed as in the 'A' region in FIG. 15. Otherwise, the step of rinsing water draining and dehydrating can be directly operated after accelerating gradually to higher speed as in the 'B' region.

With the rinse control method for a washing machine in accordance with the eighth embodiment of the present invention, the rinsing water can be infiltrated more evenly into the washing materials in order to improve rinsing efficiency, since the rinsing water can be infiltrated into the washing materials after separating the washing materials stuck on the inner surface of the inner tub 53, in the step of dehydrating before infiltrating the rinsing water by rotating the inner tub 53 at low speed.

Figure 16:
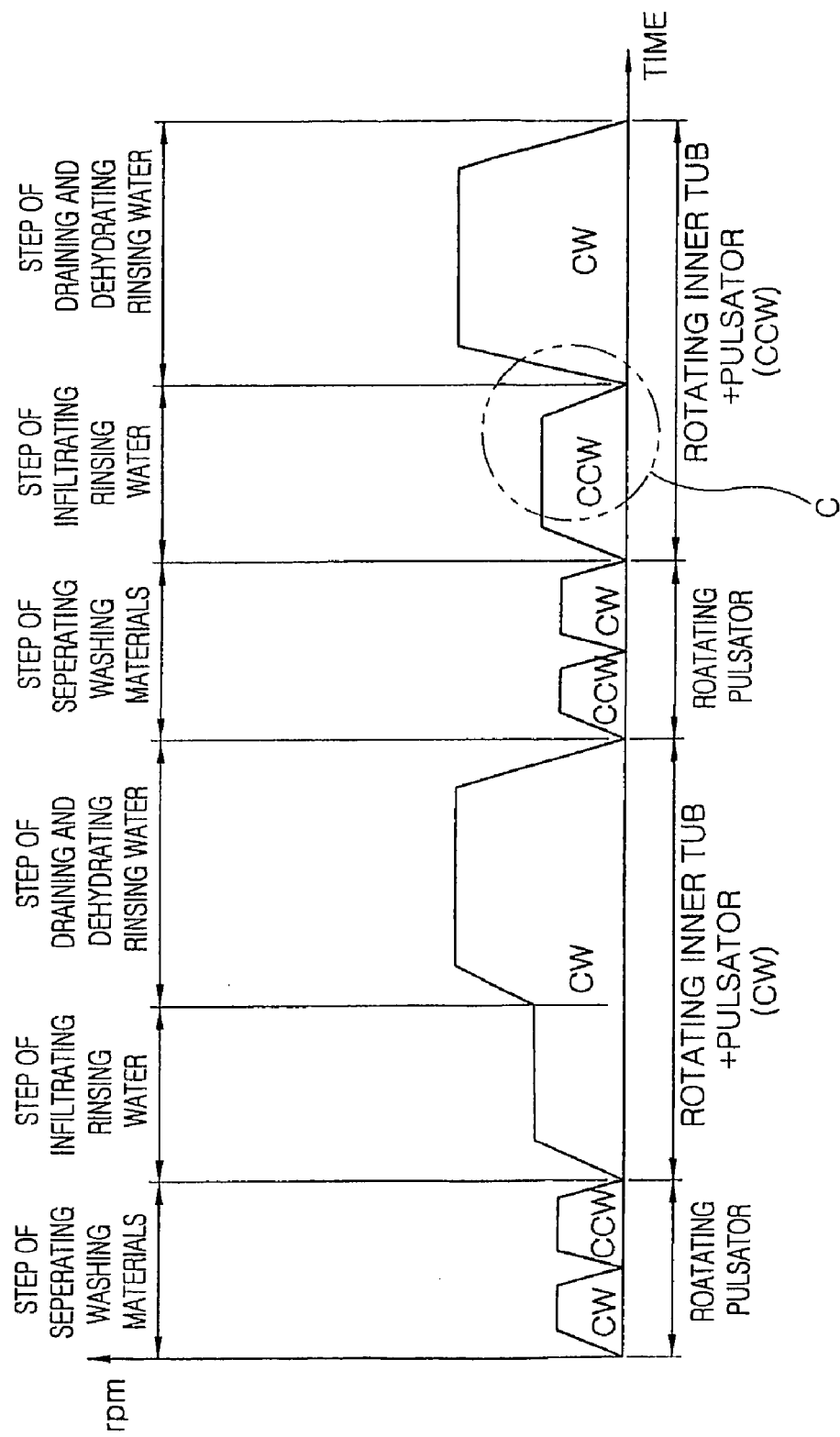
FIG. 16 is a graph illustrating changes in rotation speed of the inner tub in accordance with the ninth embodiment of the present invention.

FIG. 16 is a graph illustrating changes in rotation speed of the inner tub in accordance with a ninth embodiment of the present invention.

With the rinse control method for a washing machine in accordance with the ninth embodiment of the present invention, an operation of washing materials separation, for rotating the pulsator 55 in order to separating the washing materials stuck on the wall of the inner tub 53, is performed. At this time, the washing materials are separated in the inner tub 53 changing the rotation direction to the left or right direction and are mixed at the same time.

Therefore, as the washing materials stuck on the wall of the inner tub are separated in the dehydrating process and the washing materials which lump become disentangled to a certain degree, the rinsing water can be infiltrated into the cloth texture of the washing materials more evenly in the step of rinsing water infiltration and the passages of the rinsing water which passes through the cloth texture of the washing materials are formed variously in the step of rinsing water draining and dehydrating, thus to improve rinsing efficiency.

On the other hand, the rotation directions of the inner tub in the steps of rinsing water infiltration and rinsing water draining and dehydrating can be set opposite to each other as in the 'C' region in FIG. 16.

Figure 17:
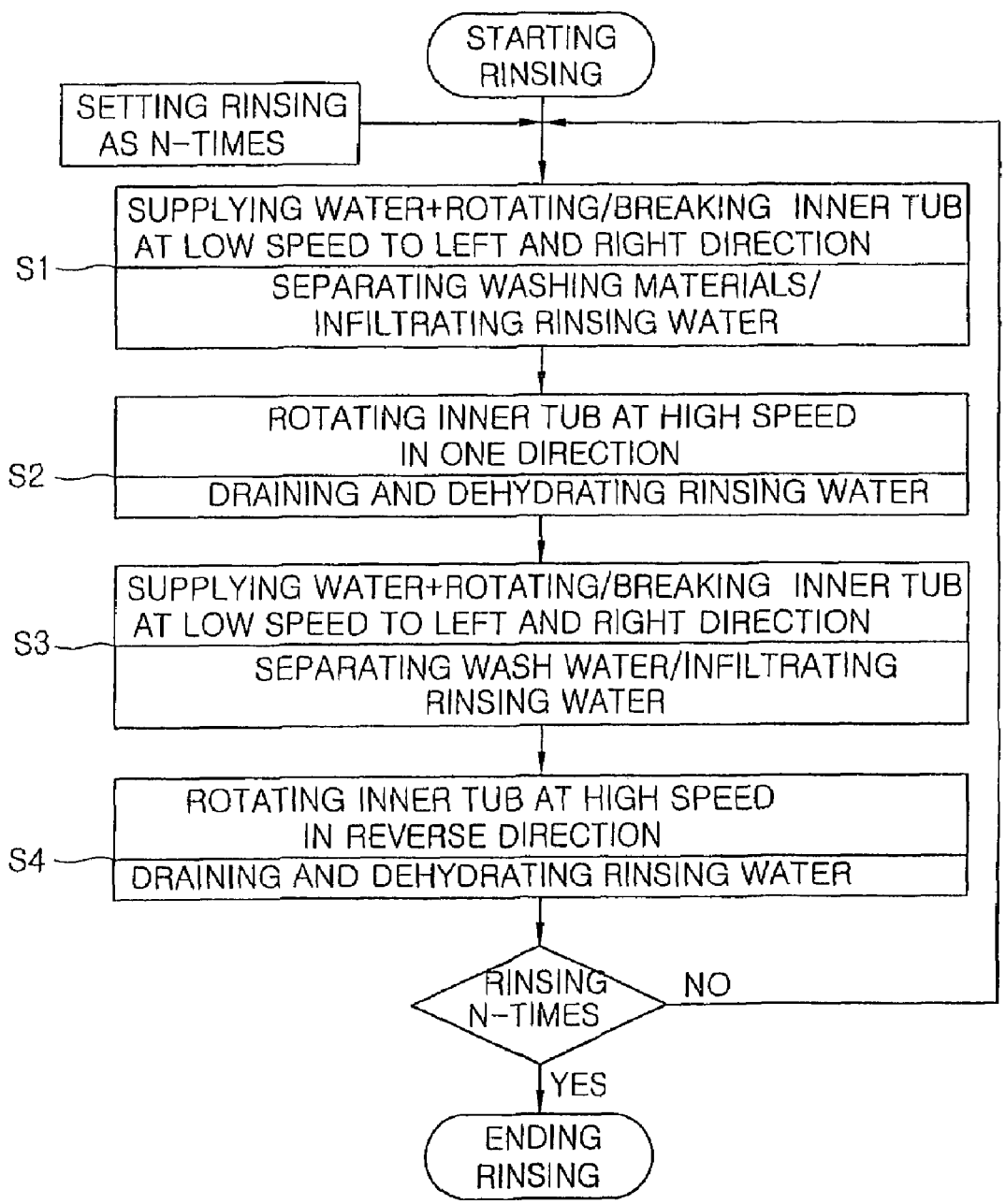
FIG. 17 is a flow chart illustrating the rinse control method for a washing machine in accordance with a tenth embodiment of the present invention.
Figure 18:
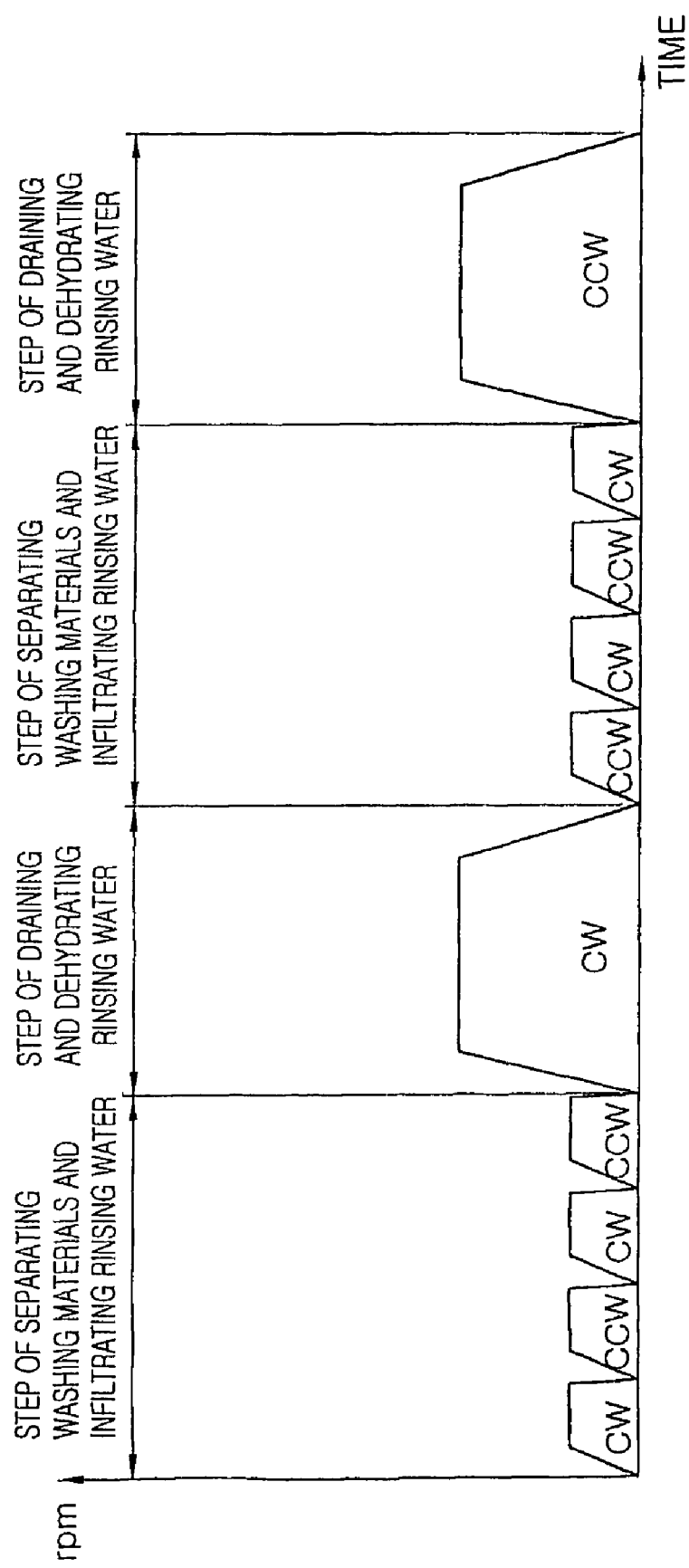
FIG. 18 is a graph illustrating changes in rotation speed of the inner tub in accordance with the tenth embodiment of the present invention.

FIG. 17 is a flow chart illustrating the rinse control method for the washing machine in accordance with a tenth embodiment of the present invention.

With the rinse control method for a washing machine in accordance with the tenth embodiment of the present invention, firstly, in the step of dehydrating for dehydrating contained in the wash water, the washing materials stuck on the wall of the inner tub 53 are separated and the process for rotating or breaking the operation of the inner tub 53 so that the rinsing water can be infiltrated into the washing materials is repeated, thus to supply rinsing water ($S_1$).

Namely, in the process that the inner tub 53 is rotated in one direction by operating the driving motor 61 and the inner tub 53 is rotated in one direction, when the rotation speed is raised to a predetermined speed, the operation of the inner tub is rapidly broken by controlling the driving motor 61, to separate the washing materials from the inner surface of the inner tub.

After the operation of the inner tub 53 is rapidly broken, the inner tub is rotated to the reverse direction again and the operation of the inner tub 53 is rapidly broken by controlling the driving motor 61 to be separated from the inner wall of the inner tub.

When the inner tub 53 is rotated to the right or left direction and at the same time the operation is rapidly broken, the washing materials are separated from the wall of the inner tub and the lumped washing materials are disentangled to a certain degree. At this time, since the rinsing water is supplied, the rinsing water can be contained in the cloth texture evenly, thus to improve rinsing efficiency.

Then, the rinsing water is drained and dehydrated, rotating the inner tub 53 at high speed so that the rinsing water infiltrated into the washing materials can be exhausted into the outside passing through the washing materials ($S_2$).

Then, the operation of rinsing water infiltration is performed by rotating or breaking the inner tub 53 ($S_3$), and the operation of rinsing water draining and dehydrating is performed ($S_4$), rotating the inner tub 53 at high speed in the opposite direction to the rotation direction of the inner tub 53 in the operation of rinsing water exhaust ($S_2$).

With the rinse control method for a washing machine in accordance with the tenth embodiment of the present invention, since the rinsing operation is performed supplying the rinsing water, under the condition that the washing materials stuck on the wall of the inner tub 53 are separated and mixed to a certain degree in the dehydrating process, the rinsing water in the washing materials are evenly infiltrated into the cloth net of the washing materials, thus to improve rinsing efficiency.

Figure 19:
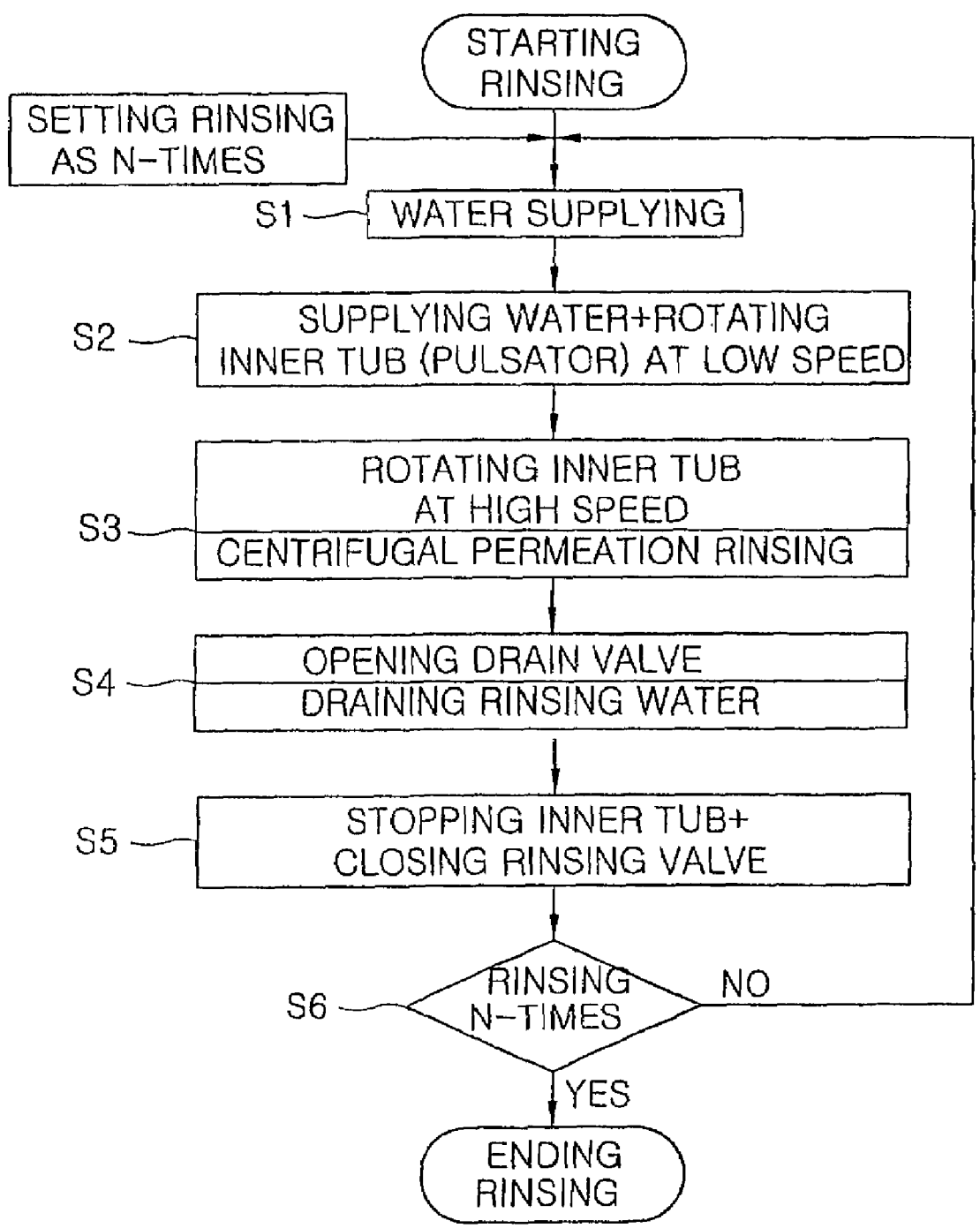
FIG. 19 is a flow chart illustrating the rinse control method for a washing machine in accordance with an eleventh embodiment of the present invention.

FIG. 19 is a flow chart illustrating the rinse control method for the washing machine in accordance with an eleventh embodiment of the present invention.

With the rinse control method for a washing machine in accordance with the eleventh embodiment of the present invention with reference to FIGS. 13 and 19, the rinsing water is supplied to a predetermined level that centrifugal permeation rinsing can be done in the outer tub 51, rotating the inner tub 53 including the pulsator 55 at low speed so that the washing materials can be distributed in the inner tub 53 evenly ($S_1$) and ($S_2$).

Here, the process that the rinsing water can be performed by rotating just a pulsator 55 without rotating the inner tub 53.

Then, when the rinsing water is supplied to a predetermined level, the inner tub 53 is rotated at high speed and accordingly, the centrifugal permeation rinsing in which rinsing water moves upwards along the inner wall of the outer tub 51 by the centrifugal force that the inner tub 53 rotates, then bumps into the tub cover 56, and is continuously circulated being fallen into the inner side of the inner tub 53, is performed ($S_3$).

Then, after the process of centrifugal permeation rinsing, the rinsing water in the inner tub 53 and outer tub 51 is drained by opening the draining valve 58 ($S_4$), and the rinsing water is dehydrated by rotating the inner tub 53 at high speed so that moisture contained in the washing materials can be removed ($S_5$).

Then, when the rinsing water included in the washing materials is dehydrated, the inner tub 53 is stopped by stopping the operation of the driving motor 61 and at the same time, the draining valve 58 is closed ($S_6$). When the above rinsing stroke is repeated as the predetermined time of the rinsing stroke ($S_7$), the rinsing stroke is completed.

With the rinse control method for a washing machine in accordance with the eleventh embodiment of the present invention, the rinsing water can be saved and rinsing efficiency of the washing materials is improved, since the centrifugal permeation rinsing is performed after supplying the rinsing water of an amount that just the centrifugal permeation rinsing can be done.

Figure 20:
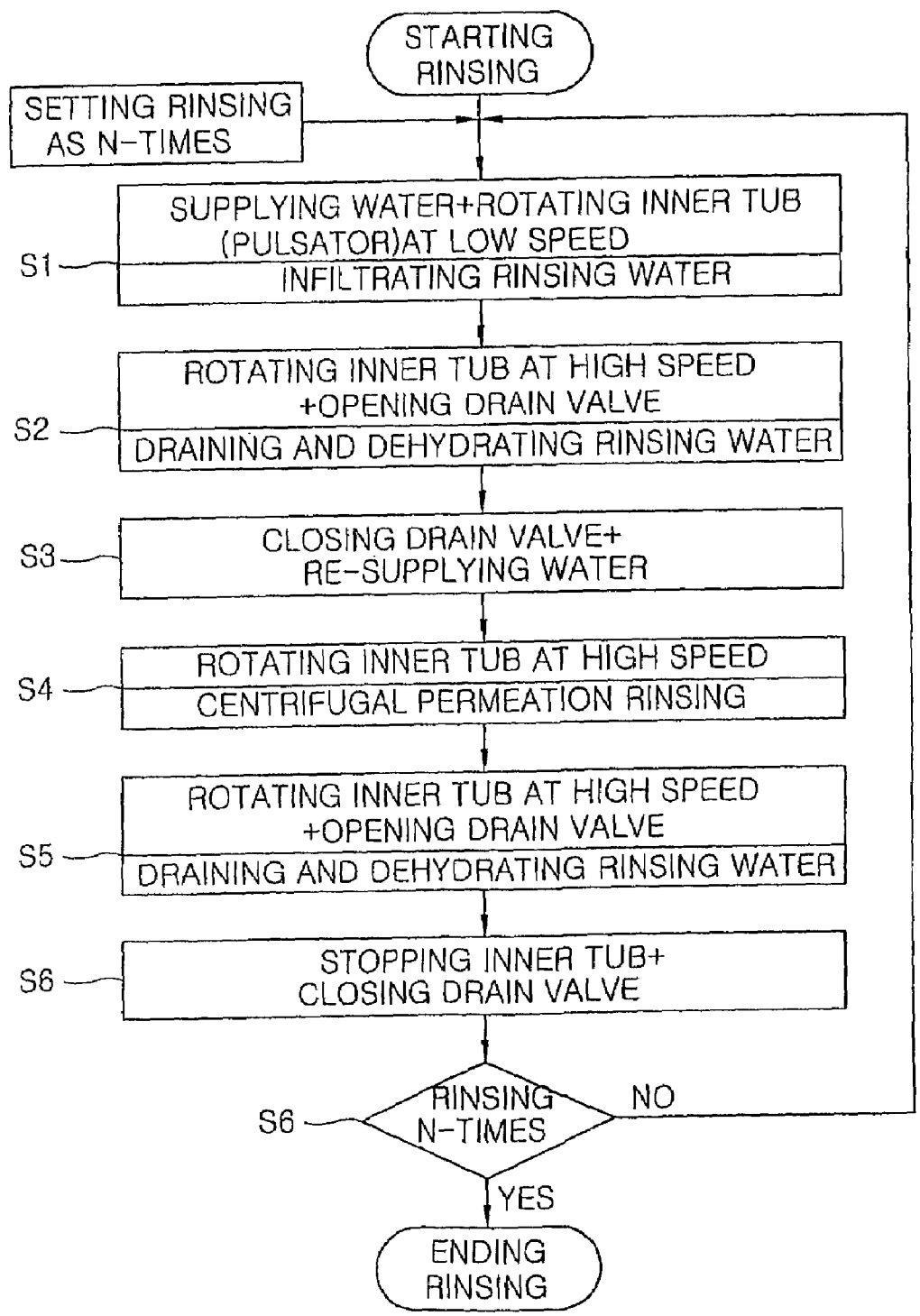
FIG. 20 is a flow chart illustrating the rinse control method for a washing machine in accordance with a twelfth embodiment of the present invention.

FIG. 20 is a flow chart illustrating the rinse control method for the washing machine in accordance with a twelfth embodiment of the present invention.

With the rinse control method for a washing machine in accordance with the twelfth embodiment of the present invention with reference to FIGS. 13 and 20, the rinsing water is supplied rotating the inner tub including the pulsator 55 at lower speed so that the rinsing water can be infiltrated into the washing materials ($S_1$).

Here, when the rinsing water is supplied, the pulsator 53 can be rotated without rotating the inner tub 53.

Then, the rinsing water is drained and dehydrated opening the draining valve 58 and rotating the inner tub 53 at high speed so that the rinsing water infiltrated into the washing materials through the above process can be exhausted to the outside through the draining hose 57 ($S_2$).

When the infiltrating permeation rinsing is finished, the draining valve 58 is closed and the rinsing water is re-supplied into the outer tub 51 to a predetermined level that the centrifugal permeation rinsing can be performed ($S_3$).

Then, when the rinsing water is supplied to a predetermined level, the inner tub 53 is rotated at high speed and the operation of centrifugal permeation rinsing is performed as the rinsing water moved upwards along the wall of the outer tub 51 falls to the inner side of the inner tub 53 again by the centrifugal force that the inner tub 53 rotates, being bumped into the tub cover 56, according to high-speed rotation of the inner tub 53 ($S_4$).

Then, after the process of centrifugal permeation rinsing, the draining valve 58 is opened and the rinsing water is drained and at the same time, dehydrated by rotating the inner tub 53 at high speed ($S_5$).

When the rinsing water contained in the washing materials is dehydrated, the inner tub 53 is stopped and at the same time, the draining valve 58 is closed ($S_6$). In addition, when the rinsing stroke is repeated to the predetermined numbers ($S_7$), the rinsing stroke is completed.

Figure 21:
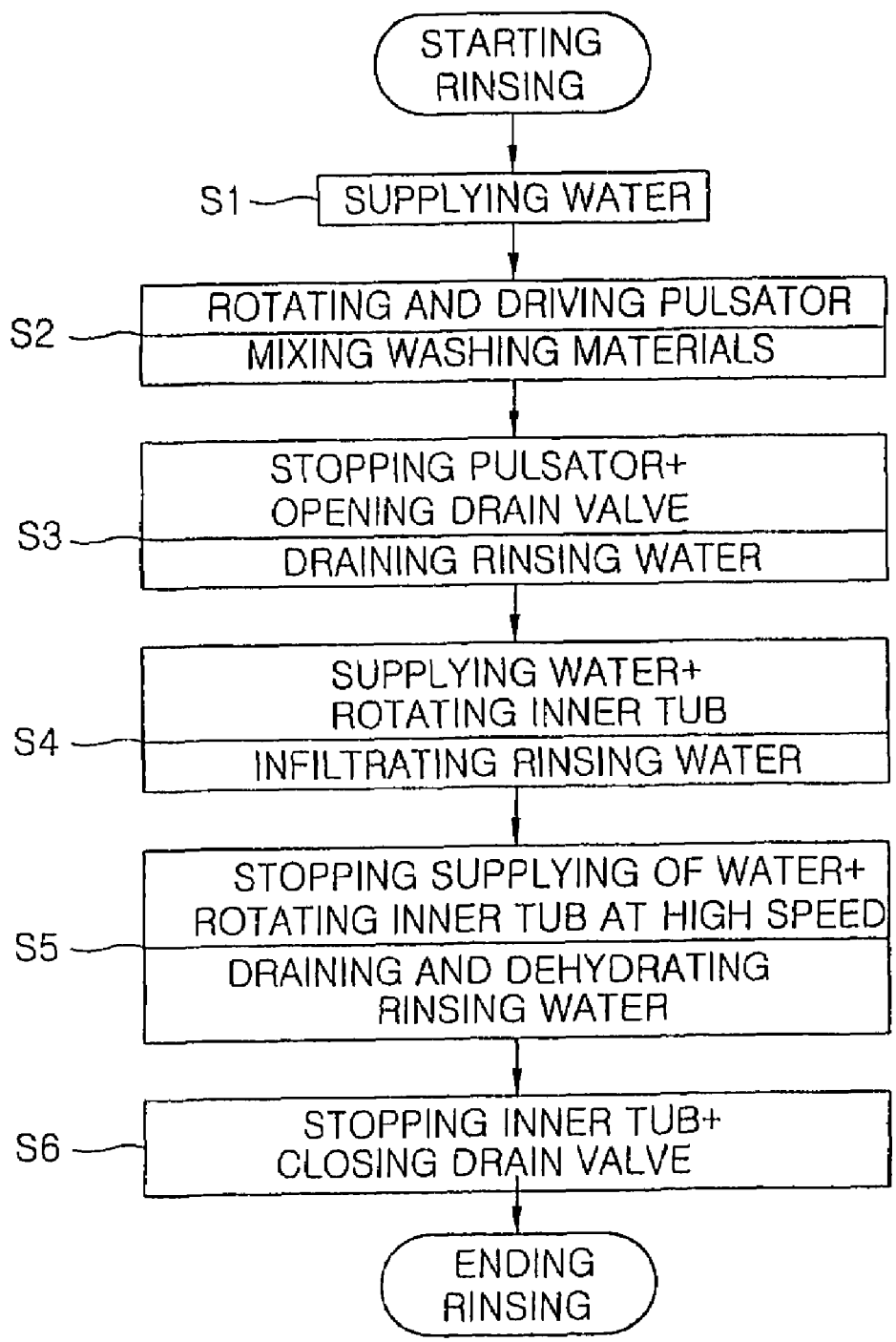
FIG. 21 is a flow chart illustrating the rinse control method for a washing machine in accordance with a thirteenth embodiment of the present invention.

FIG. 21 is a flow chart illustrating the rinse control method for the washing machine in accordance with a thirteenth embodiment of the present invention.

With the rinse control method for a washing machine in accordance with the thirteenth embodiment of the present invention, is a control method of the Nth rinsing after processing of N–1 times of rinsing by the rinsing method in accordance with the eleventh and twelfth embodiments, that is, the last rinsing process.

With reference to FIGS. 13 and 21, when the rinsing water is supplied to a predetermined level ($S_1$) after processing the rinsing process of the eleventh and twelfth embodiments is processed, mixing rinsing is performed by rotating the pulsator 55 to the left and right directions by controlling the driving motor 61 ($S_2$).

At this time, as the pulsator 55 rotates to the left and right directions, the washing materials in the inner tub 53 are mixed and accordingly, contact between the washing materials and rinsing water can be performed uniformly.

Then, rotation of the pulsator 55 is stopped and the rinsing water stored in the inner tub 53 and outer tub 51 is drained by opening the draining valve 58 ($S_3$).

Then, the inner tub 53 is rotated at low speed supplying the rinsing water into the inner tub 53, in order to infiltrate the rinsing water into the washing materials and simultaneously the infiltrated rinsing water passes through the washing materials, thus to directly perform draining and dehydrating ($S_4$) and ($S_5$).

Namely, the rinsing water is supplied rotating the inner tub 53 at low speed by controlling the driving motor 61 that the rinsing water can be infiltrated into the washing materials. After a predetermined time, the rinsing water is drained, rotating the inner tub 53 at a speed that the rinsing water infiltrated into the washing materials can pass through the washing materials and exhausted to the outside.

Then, when the operation of rinsing water exhaust is completed after the rinsing water infiltrated into the washing materials, the inner tub 53 is stopped and at the same time, the draining valve 58 is closed ($S_6$), thus to complete the rinsing stroke.

Figure 22:
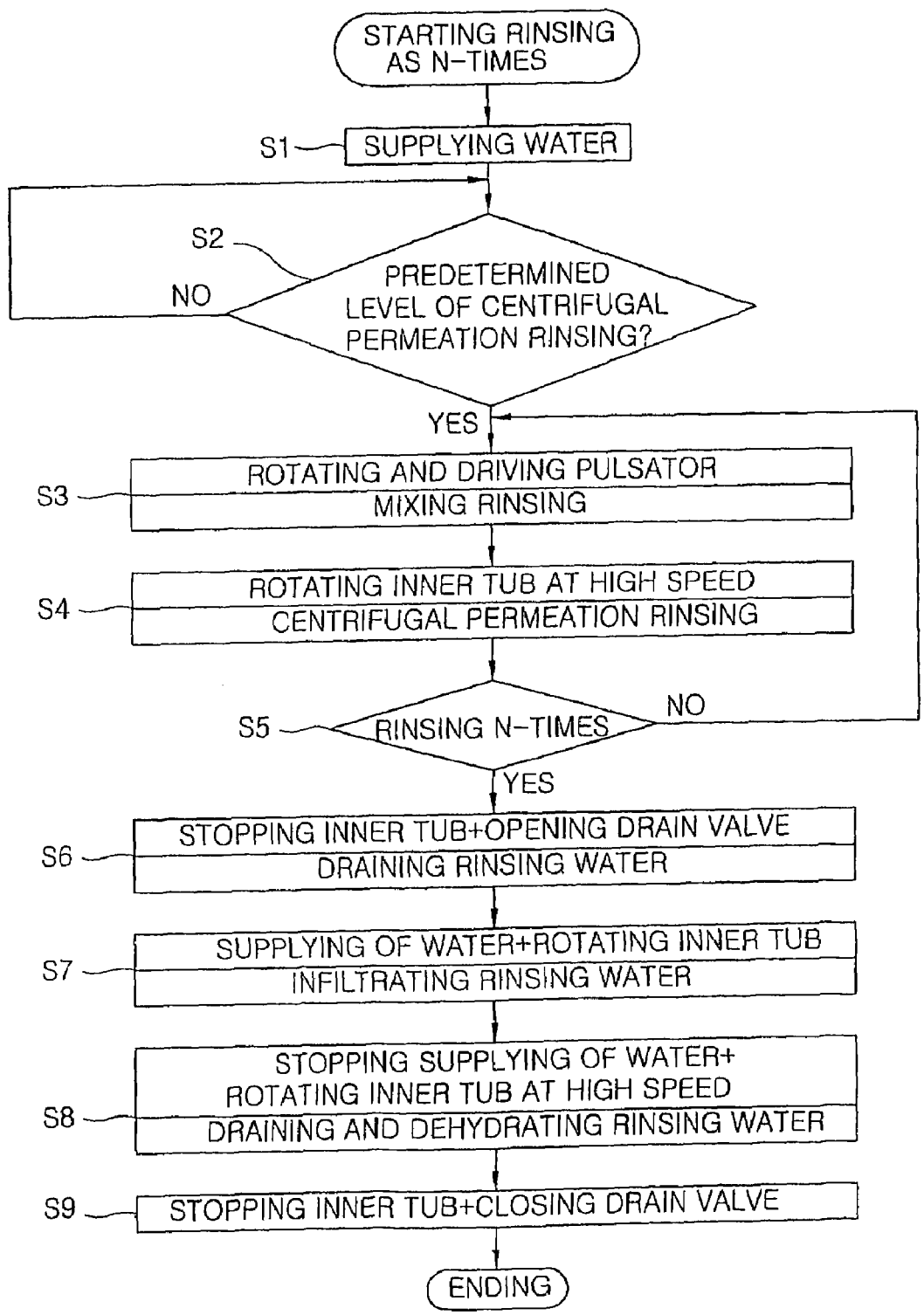
FIG. 22 is a flow chart illustrating the rinse control method for a washing machine in accordance with a fourteenth embodiment of the present invention.

FIG. 22 is a flow chart illustrating the rinse control method for the washing machine in accordance with a fourteenth embodiment of the present invention.

The rinse control method for a washing machine in accordance with the fourteenth embodiment of the present invention, is a control method of the Nth rinsing after processing of N–1 times of rinsing by the rinsing method in accordance with the eleventh and twelfth embodiments, that is, the last rinsing process.

After performing rinsing of the eleventh or twelfth embodiments, the rinsing water is supplied into the inner tub 53 to a predetermined level that the centrifugal permeation rinsing can be performed ($S_1$), and when the rinsing water is supplied to the predetermined level ($S_2$), mixing rinsing is performed ($S_3$) rotating the pulsator 55 to the left and right directions by controlling the driving motor 61.

At this time, the washing materials stuck on the wall of the inner tub 53 are separated evenly and rinsing is performed, in the process of dehydration of the former washing and rinsing journeys.

Then, centrifugal permeation rinsing is performed as the inner tub 53 is rotated at higher speed than a predetermined speed and the rinsing water falls to the inner side of the inner tub 53 over the upper portion of the inner tub 53, bumping into the tub cover 56 by the centrifugal force that the inner tub 53 rotates ($S_4$).

After repeating the mixing rinsing and centrifugal permeation rinsing as a predetermined time ($S_5$), the rotation of the inner tub is stopped and the rinsing water stored in the inner tub 53 and outer tub 51 is drained by opening the draining valve 58 ($S_6$).

Then, the rinsing water is infiltrated into the washing materials by rotating the inner tub 53 at low speed, supplying the rinsing water into the inner tub 53 and at the same time, draining and dehydrating are performed as the rinsing water passes the washing materials ($S_7$) and ($S_8$).

Then, when the operation of rinsing water exhaust is completed after the rinsing water infiltrated into the washing materials is dehydrated, the inner tub 53 is stopped and at the same time, the draining valve is closed ($S_9$), thus to complete the rinsing stroke.

With the rinse control method for a washing machine in accordance with the fourteenth embodiment of the present invention, centrifugal permeation rinsing and infiltration permeation rinsing is repeated, thus to improve rinsing efficiency.

Figure 23:
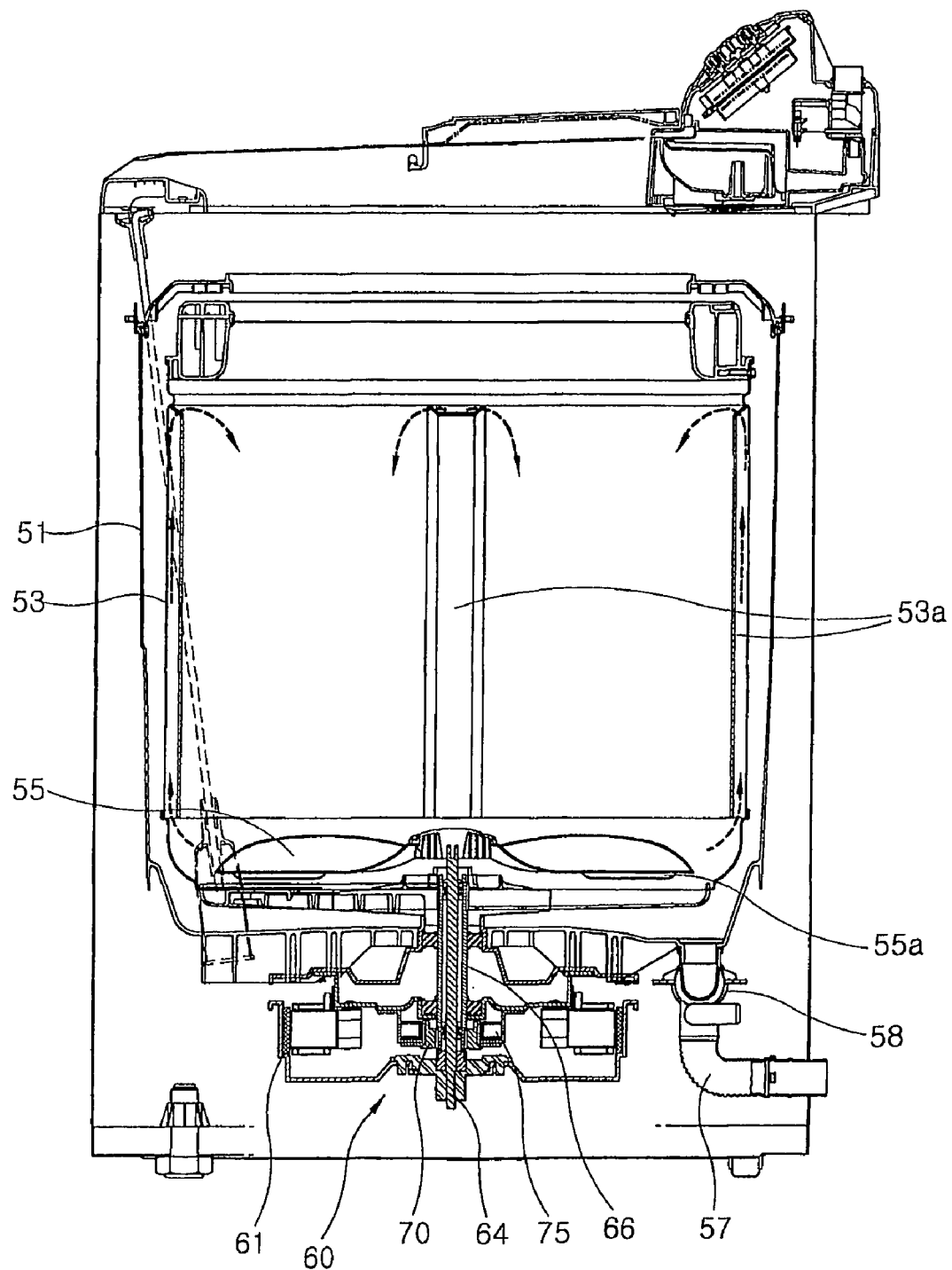
FIG. 23 is a cross-sectional view showing a washing machine in which the rinse control method is applied in accordance with fifteenth to sixteenth embodiments of the present invention.

FIG. 23 is a cross-sectional view showing a washing machine in which the rinse control method is applied in accordance with the fifteenth to sixteenth embodiments of the present invention. Parts which are identical and similar to the components in FIG. 13 are given the same reference numerals and the description will be omitted, in describing the double shaft direct driving washing machine shown in FIG. 23.

The double shaft direct driving washing machine is composed so that the pulsator 55 in the inner tub 53 rotates alone by the driving apparatus 60 including the clutch instrument 70 and the pulsator 55 and inner tub 53 rotate as a single body.

Particularly, on the inner surface of the inner tub 53, a circulation passage 53a is formed and when the pulsator 55 rotates at higher speed than a predetermined speed, the rising water is re-circulated as it moves upwards and falls down to the inner portion of the inner tub 53 again.

On the lower surface of the pulsator 55, an impeller 55a for generating a flowing force so that the wash water can move upwards through the circulation passage 53a is formed protruded.

The fifteenth and sixteenth embodiments in accordance with the present invention, applied to the rinse control method for the washing machine including the double shaft direct drive washing machine will be described with reference to FIGS. 24 and 25 as follows.

Figure 24:
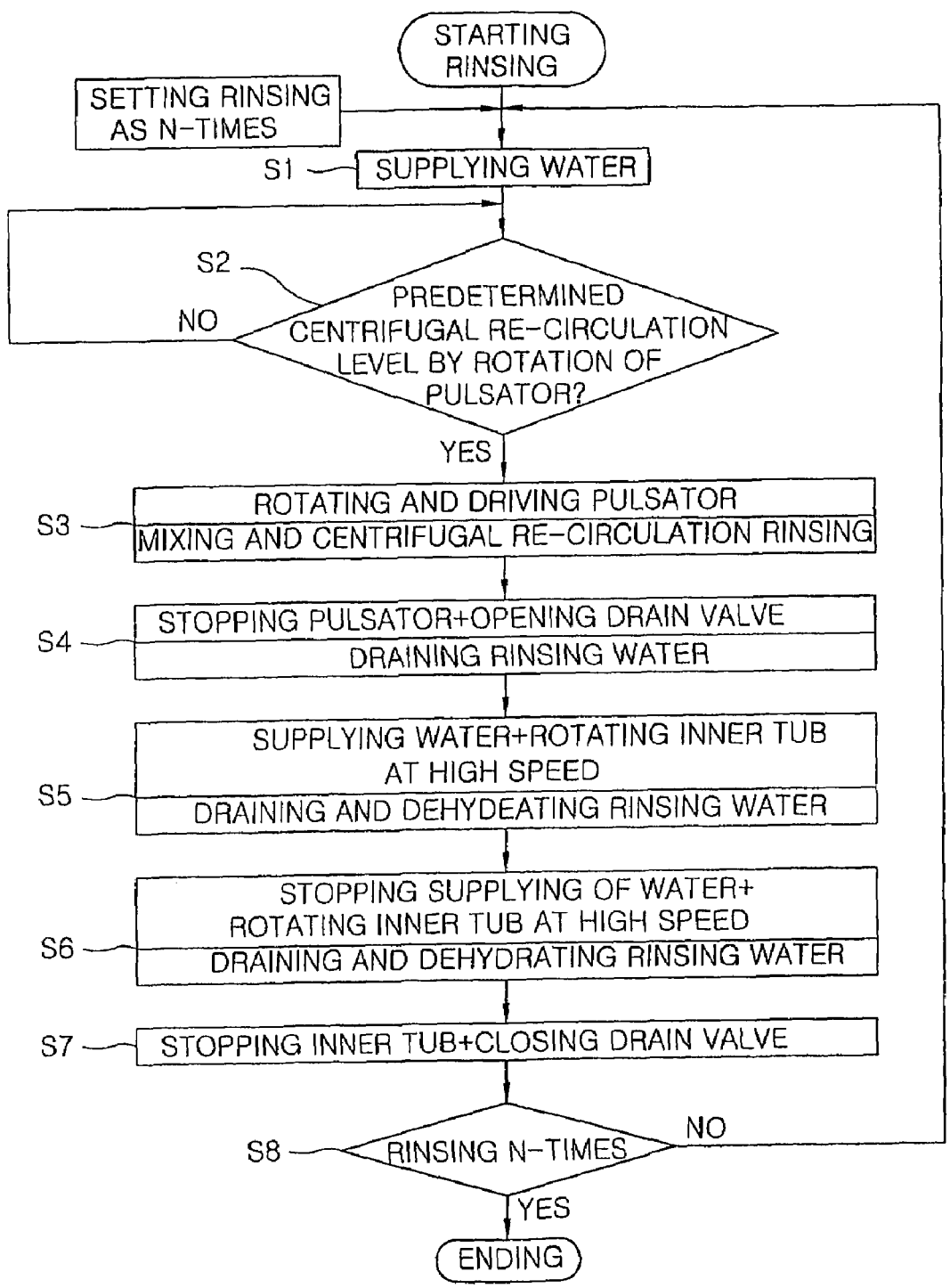
FIG. 24 is a flow chart illustrating the rinse control method for a washing machine in accordance with a fifteenth embodiment of the present invention.

FIG. 24 is a flow chart illustrating the rinse control method for a washing machine in accordance with the fifteenth embodiment of the present invention.

With the rinse control method for a washing machine in accordance with the fifteenth embodiment of the present invention with reference to FIGS. 23 and 24, the rinsing water is supplied into the inner tub 53 to a predetermined level that centrifugal permeation rinsing can be performed through the circulation passage 53a of the inner tub 53 ($S_1$) after completing dehydrating operation of the washing stroke.

Then, when the rinsing water is supplied to a predetermined level in the inner tub 53 ($S_2$), the centrifugal re-circulation rinsing is performed ($S_3$) as the rinsing water falls from the upper portion of the inner tub 53 through the circulation passage 53a of the inner tub 53, by rotating the pulsator 55 at higher speed than a predetermined speed by controlling the driving motor 61.

At this time, since the solenoid 75 of the clutch instrument 70 is turned on and the slider 73 is divided from the clutch gear 71 in the inner tub 53, rotational force of the driving motor 61 is transmitted just to the pulsator 55. In addition, the rinsing water stored at the lower portion of the inner tub 53 moves upwards through the circulation passage 53a by the impeller 55a formed on the bottom surface when the pulsator 55 rotates, flows into the inner tub 53 and circulates after passing the washing materials.

Also, as the pulsator 55 rotates to the left and right directions, the washing materials in the inner tub 53 are mixed and contact between the washing materials and rinsing water can be performed uniformly.

Then, after processes of centrifugal re-circulation rinsing and mixing rinsing, rotation of the pulsator 55 is stopped by stopping the driving motor 61 and the rinsing water stored in the inner tub 53 and outer tub 51 is drained by opening the draining valve 58.

Then, the inner tub is rotated at low speed so that the rinsing water can be infiltrated into the washing materials, supplying the rinsing water into the inner tub 53 and at the same time, draining and dehydrating are directly performed as the infiltrated rinsing water passes the washing materials ($S_5$) and ($S_6$).

Namely, the rinsing water is supplied, rotating he inner tub 53 at low speed by controlling the driving motor 61 at a speed that the rinsing water can be infiltrated into the washing materials and after a predetermined time, the rinsing water is drained, rotating the inner tub at high speed that the rinsing water infiltrated into the washing materials can be exhausted to the outside passing through the washing materials.

When the inner tub 53 rotates at high speed, the rinsing water infiltrated into the washing materials is drained passing through the cloth net of the washing materials and at the same time, by the force that the rinsing water passes the cloth net and is drained, stained dregs, contaminated materials, detergent, bubbles are separated and drained to the outer tub 51 through a hole of the inner tub 53. Then, the contaminants, bubbles and the like including the rinsing water are exhausted to the outside through the draining hose 57.

Then, when the operation of rinsing water exhaust is completed after the rinsing water is dehydrated, the operation of the driving motor 61 is stopped to stop the inner tub 53, the draining valve 58 is closed ($S_7$), and the rinsing stroke identical as the above operation repeated as a predetermined time of the rinsing stroke, thus to complete the rinsing stroke.

Therefore, with the rinse control method for a washing machine in accordance with the fifteenth embodiment of the present invention, centrifugal re-circulation rinsing is performed after supplying a predetermined amount of rinsing water to the outer tub 51, and then rinsing is completed by directly performing draining and dehydrating operations after infiltrating the rinsing water into the washing materials. Therefore, rinsing operation can be performed without filling rinsing water into the outer tub 61 and inner tub 63 to a predetermined level, thus to save the rinsing water and since centrifugal re-circulation rinsing and infiltration rinsing are continuously performed, rinsing efficiency can be improved.

FIG. 25 is a flow chart illustrating the rinse control method for a washing machine in accordance with a sixteenth embodiment of the present invention.

With the rinse control method for a washing machine in accordance with the sixteenth embodiment of the present invention, firstly, rinsing water is supplied into the inner tub 53 to a predetermined level that centrifugal re-circulation rinsing can be performed through the circulation passage 53a of the inner tub 53 ($S_1$), When the rinsing water is supplied into the inner tub 53 to the predetermined level ($S_2$), mixing rinsing is performed ($S_3$) rotating the pulsator 55 to the left and right directions by controlling the driving motor 61.

At this time, rinsing operation is performed as the washing materials stuck on the wall of the inner tub 53 are dispersed evenly.

Then, centrifugal re-circulation rinsing is performed ($S_4$) as the rinsing water falls from the upper portion of the inner tub 53 through the circulation passage 53a of the inner tub 53 by rotating the pulsator 55 at higher speed than a predetermined speed.

After repeating the mixing rinsing and centrifugal re-circulation rinsing as a predetermined time ($S_5$), rotation of the pulsator 55 is stopped by stopping the driving motor 61 and the rinsing water stored in the inner tub 53 and outer tub 51 is drained by opening the draining valve 58 ($S_6$).

Then, the rinsing water is infiltrated into the washing materials by rotating the inner tub 53 at low speed, supplying the rinsing water into the inner tub 53 again and at the same time, draining and dehydrating are directly performed ($S_7$) and ($S_8$) as the rinsing water passes through the washing materials.

Then, when the operation of rinsing water exhaust is completed after the rinsing water infiltrated into the washing materials is dehydrated, the inner tub 53 is stopped by stopping the operation of the driving motor 61, the draining valve 58 is closed ($S_9$), and the rinsing stroke which is identical with the above operation is repeated as a predetermined time of the rinsing stroke ($S_{10}$), thus to complete the rinsing stroke.

With the rinse control method for a washing machine in accordance with the sixteenth embodiment of the present invention, mixing rinsing is performed firstly, then centrifugal re-circulation rinsing is performed and the processes are repeated as several times differently from the process in the former embodiments in which mixing rinsing and centrifugal rinsing are simultaneously performed, thus to improve rinsing efficiency of the washing materials.

INDUSTRIAL APPLICABILITY

As so far described, according to the rinse control method for the washing machine in accordance with the present invention, bubbles and detergent including rinsing water are exhausted by rotating the rinsing water under the condition that the rinsing water is infiltrated into the washing materials by rotating the inner tub simultaneously as water is supplied. Therefore, rinsing water can be saved and at the same time, rinsing efficiency can be improved.

Also, in accordance with embodiment of the present invention, since rotation direction of the inner tub is changed according to the respective steps, the rinsing water can be infiltrated into the washing materials evenly and by exhausting the infiltrated rinsing water, passing the washing materials, rinsing efficiency can be more improved.

Also, in accordance with embodiment of the present invention, rinsing efficiency can be improved as the rinsing water is smoothly infiltrated into the washing materials by repeating breaking, rotating the pulsator or the inner tub so that the washing materials stuck on the inner wall of the inner tub can be separated, after the washing stroke or dehydrating operation of the former step.

Also, in accordance with embodiment of the present invention, rinsing efficiency can be improved using small amount of rinsing water as the operations of centrifugal permeation rinsing for circulating the rinsing water by rotating the inner tub at high speed, and infiltration permeation rinsing for directly draining and dehydrating, infiltrating the rinsing water into the washing materials are performed in turn.

In addition, in accordance with embodiment of the present invention, rinsing efficiency can be improved using small amount of water as infiltration rinsing is performed, rotating the inner tub simultaneously as water is supplied after performing re-circulation rinsing through a passage formed on an inner wall of the inner tub by rotating the pulsator.

The invention claimed is:

1. A rinse control method for a washing machine, comprising:
    a rinsing water supplying and infiltrating step for supplying rinsing water, rotating an inner tub at relatively low speed so that the rinsing water can be infiltrated into washing materials;
    a circulation rinsing step for rinsing washing materials as the rinsing water is circulated and spouted from an upper portion of the inner tub, rotating the inner tub at relatively high speed; and
    a rinsing water permeating and exhausting step for draining the rinsing water, rotating the inner tub at relatively high speed so that the rinsing water can be exhausted to the outside passing through the washing material, and the rotation speed of the inner tub of the rinsing water permeating and exhausting step is lower than that of the circulation rinsing step.

2. The method of claim 1, wherein the rinsing water supplying and infiltrating step supply the rinsing water, gradually increasing rotation speed of the inner tub.

3. The method of claim 1, wherein rotation speed of the inner tub in the rinsing water supplying and infiltrating step is lower than 300 rpm, and the rotation speed of the inner tub in the rinsing water permeating and exhausting step is higher than 200 rpm.

4. The method of claim 1, wherein the circulation rinsing step is performed under the condition that the supply of water is stopped when the storage amount of rinsing water reaches a predetermined level, and between the rinsing water supplying and infiltrating step and the rinsing water permeating and exhausting step.

5. The method of claim 1, further comprising:
    a water supplying and draining and permeation rinsing step for draining the rinsing water stored in the outer tub and at the same time, continuously supplying the rinsing water until a predetermined time is passed from the point of time of starting draining or the water level is lower than a predetermined level so that the washing materials are rinsed, between the rinsing water supplying and infiltrating step and the rinsing water permeating and exhausting step.

6. The method of claim 1, wherein the rinsing water supplying and infiltrating step and the rinsing water permeating and exhausting step are repeatedly performed as a predetermined setting steps and rotation directions of the inner tub at least one step of the respective setting steps are opposite to the rotation direction of the other steps.

7. The method of claim 6, wherein the rotation direction of the inner tub in the rinsing water supplying and infiltrating step and the rinsing water permeating and exhausting step is opposite to the rotation direction of the former steps.

8. The method of claim 6, wherein the rotation speed of the inner tub in the rinsing water supplying and infiltrating step is set higher than the rotation speed of the former rinsing water permeating and exhausting step.

9. The method of claim 1, wherein the rotation direction of the inner tub in the rinsing water supplying and infiltrating step and the rotation direction of the inner tub in the rinsing water permeating and exhausting step are opposite to each other.

10. The method of claim 1, wherein the rinsing water supplying and infiltrating step supplies rinsing water, rotating the inner tub at low speed and rotates the inner tub with a remaining power for a predetermined time by stopping the operation of a driving motor so that the rinsing water is infiltrated into the washing materials when a predetermined amount of the rinsing water is supplied into the inner tub.

11. The method of claim 1, further comprising;
a remaining power rotating and draining step for exhausting the rinsing water, rotating the inner tub with a remaining power for a predetermined time under the condition that the operation of the driving motor for rotating the inner tub is stopped, after the rinsing water permeating and exhausting step.

12. The method of claim 1, further comprising:
a washing materials separating step for rotating a pulsator so as to separate the washing materials stuck on the wall of the inner tub by the dehydrating process for dehydrating water contained in the washing materials, before the rinsing water supplying and infiltrating step or after the rinsing water permeating and exhausting step.

13. The method of claim 1, wherein the rinsing water permeating and exhausting step comprises supplying rinsing water and repeatedly performing a rotating and braking processes, so that the rinsing water can be infiltrated and the washing materials stuck on the wall of the inner tub in a dehydrating processes for dehydrating water can be separated.

14. The method of claim 1, between the rinsing water supplying and infiltrating step and rinsing water permeating and exhausting step, further comprising:
a centrifugal permeation rinsing step for performing centrifugal permeation rinsing as the rinsing water falls to the inner side of the inner tub over the upper portion of the inner tub by the centrifugal force that the inner tub rotates at high speed, when the rinsing water is supplied to a predetermined level; and
a rinsing water draining step for draining rinsing water in the inner tub and the outer tub after the centrifugal permeation rinsing step.

15. The method of claim 1, after the rinsing water permeating and exhausting step, further comprising:
a centrifugal permeation rinsing step for re-supplying the rinsing water to a water level that the operation of performing a centrifugal permeation rinsing can be performed, and performing the centrifugal permeation rinsing as the rinsing water falls to the inner side of the inner tub over the upper portion of the inner tub by the centrifugal force that the inner tub rotates at high speed; and
a rinsing water dehydrating step for dehydrating, at the same time that the rinsing water is drained by rotating the inner tub at high speed after the centrifugal permeation rinsing step.

16. The method of claim 1, at the last rinsing steps after repeating the rinsing water supplying and infiltrating step and rinsing water permeating and exhausting step as a predetermined setting time, further comprising the steps of:
rinsing by supplying rinsing water and at the same time mixing the washing materials, rotating a pulsator;
draining the rinsing water in the inner tub and outer tub after the above step; and
draining and dehydrating for infiltrating the rinsing water into the washing materials by rotating the inner tub, supplying the rinsing water, and at the same time directly draining and dehydrating after the rinsing water passes through the washing materials, after the above step.

17. The method of claim 1, at the last rinsing steps after repeating the rinsing water supplying and infiltrating step and rinsing water permeating and exhausting step as a predetermined setting time, further comprising the steps of:
re-supplying the rinsing water to a water level that the operation of centrifugal permeation rinsing can be performed;
mixing for mixing the washing materials by rotating a pulsator when the rinsing water is supplied to a predetermined level at the above step;
centrifugal permeation rinsing for performing centrifugal permeation rinsing as the rinsing water falls to the inner side of the inner tub over the upper portion of the inner tub by due to the centrifugal force that the inner tub rotates at high speed after the above mixing step;
repeating the steps of mixing and centrifugal permeation rinsing, and draining the rinsing water; and
draining and dehydrating for infiltrating the rinsing water into the washing materials by rotating the inner tub, supplying the rinsing water after the above step, and directly draining and dehydrating after passing the rinsing water through the washing materials.

18. A rinse control method for a washing machine, comprising:
a rinsing water supplying step for supplying the rinsing water to a water level that the operation of centrifugal re-circulation rinsing can be performed;
a mixing and re-circulation rinsing step for performing centrifugal re-circulation rinsing as the rinsing water falls to the inner side of the inner tub over the upper portion of an inner tub at the same time that the washing materials are mixed by rotating a pulsator, when the rinsing water is supplied to a predetermined level in the rinsing water supplying step;
a draining step for draining rinsing water in the inner tub and outer tub after performing the mixing and re-circulation rinsing step; and
a draining and dehydrating step for infiltrating the rinsing water into the washing materials by rotating the inner tub, supplying the rinsing water after the above step, and directly draining and dehydrating after passing the rinsing water through the washing materials.

19. The method of claim 18, wherein the mixing and re-circulation rinsing step further comprises the steps of:
mixing rinsing in which the pulsator rotates at low speed; and
centrifugal re-circulation rinsing in which the pulsator rotates at high speed.

20. The method of claim 18, wherein, in the mixing and re-circulation rinsing step, the mixing rinsing in which the pulsator rotates at low speed is firstly processed, and then the centrifugal re-circulation rinsing in which the pulsator rotates at high speed is processed.

* * * * *